(12) United States Patent
Datta et al.

(10) Patent No.: US 7,792,968 B2
(45) Date of Patent: Sep. 7, 2010

(54) METHOD OF MAINTAINING A PEER-TO-PEER RELAY NETWORK

(75) Inventors: Glen Van Datta, San Diego, CA (US);
Anthony Mai, San Marcos, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 0 days.

(21) Appl. No.: 11/895,968

(22) Filed: Aug. 28, 2007

(65) Prior Publication Data
US 2008/0046554 A1     Feb. 21, 2008

Related U.S. Application Data

(62) Division of application No. 10/700,798, filed on Nov. 3, 2003, now Pat. No. 7,627,678.

(60) Provisional application No. 60/513,098, filed on Oct. 20, 2003.

(51) Int. Cl.
*G06F 15/173* (2006.01)
(52) U.S. Cl. ............... 709/226; 709/224; 709/227
(58) Field of Classification Search ........... 709/223, 709/225, 227, 238, 224, 226, 243, 244
See application file for complete search history.

(56) References Cited

U.S. PATENT DOCUMENTS

| | | | |
|---|---|---|---|
| 5,630,184 A * | 5/1997 | Roper et al. | 709/237 |
| 5,701,427 A | 12/1997 | Lathrop | |
| 6,421,347 B1 * | 7/2002 | Borgstahl et al. | 370/310 |
| 6,701,344 B1 | 3/2004 | Holt et al. | |
| 7,065,579 B2 * | 6/2006 | Traversat et al. | 709/225 |
| 7,130,921 B2 * | 10/2006 | Goodman et al. | 709/238 |

(Continued)

FOREIGN PATENT DOCUMENTS

EP      0 913 965      5/1999

(Continued)

OTHER PUBLICATIONS

Steven Hessing: "Peer to Peer Messaging Protocol (PPMP)" Internet Draft, Apr. 2002, pp. 1-57, XP015001173.

(Continued)

*Primary Examiner*—Ramy M Osman
(74) *Attorney, Agent, or Firm*—Frommer Lawrence & Haug LLP; William S. Frommer; Paul A. Levy

(57) ABSTRACT

A method of maintaining a peer-to-peer relay network includes sending a maintenance message from a peer computer system to each of one or more connected peer computer systems connected to the peer computer system and evaluating any responses received from the one or more connected peer computer systems. The connection between the peer computer system and a connected peer computer system is closed when the response from that connected peer computer system is not acceptable. Each peer computer system is connected to a number of other peer computer systems that is less than or equal to a connection limit and each peer computer system is configured to relay data to peer computer systems connected to that peer computer system according to a set of one or more relay rules.

7 Claims, 31 Drawing Sheets

U.S. PATENT DOCUMENTS

| | | | |
|---|---|---|---|
| 7,174,382 B2 * | 2/2007 | Ramanathan et al. | 709/227 |
| 7,177,950 B2 | 2/2007 | Narayan et al. | |
| 7,263,070 B1 * | 8/2007 | Delker et al. | 709/227 |
| 7,272,636 B2 * | 9/2007 | Pabla | 709/223 |
| 2001/0044339 A1 | 11/2001 | Cordero et al. | |
| 2002/0006114 A1 * | 1/2002 | Bjelland et al. | 370/355 |
| 2002/0055989 A1 | 5/2002 | Stringer-Calvert et al. | |
| 2002/0107935 A1 * | 8/2002 | Lowery et al. | 709/217 |
| 2002/0119821 A1 | 8/2002 | Sen et al. | |
| 2002/0184310 A1 | 12/2002 | Traversat et al. | |
| 2003/0055892 A1 | 3/2003 | Huitema et al. | |
| 2003/0104829 A1 * | 6/2003 | Alzoubi et al. | 455/517 |
| 2004/0103179 A1 | 5/2004 | Damm et al. | |
| 2005/0007964 A1 * | 1/2005 | Falco et al. | 370/256 |
| 2005/0063409 A1 | 3/2005 | Oommen | |
| 2005/0080858 A1 | 4/2005 | Pessach | |

FOREIGN PATENT DOCUMENTS

| | | |
|---|---|---|
| EP | 1 107 508 | 6/2001 |
| WO | WO 02/11366 | 2/2002 |
| WO | WO 03/069495 | 8/2003 |

OTHER PUBLICATIONS

Song Jiang et al: "FloodTrial : an efficient file search technique in unstructured peer-to-peer systems" GLOBECOM 2003, vol. 5, Dec. 1, 2003, pp. 2891-2895, XP010678188.

Dutkiewicz E Ed—Institute of Electrical and Electronics Engineers: "Impact of transmit range on throughput performance in mobile ad hoc networks" ICC 2001. 2001 IEEE International Conference on Communications. Conference Record. Helsinky, Finland, Jun. 11-14, 2001, IEEE International Conference on Communications, New York, NY: IEEE, US, vol. 1 of 10, Jun. 11, 2001, pp. 2933-2937, XP 010553662 ISBN: 0-7803-7097-1.

Kim Y Ed—Association for Computing Machinery: "Simple and Fault—Tolerant Key Agreement by Dynamic Collaborative Groups" Proceedings of the $7^{TH}$ ACM Conference on Computer and Communications Security. CS 2000. Athens, Greece, Nov. 1-4, 2000, ACM Conference on Computer and Communications Security, New Your, NY: ACM, US, vol. CONF. 7, Nov. 1, 2000, pp. 1-38, XP 002951317 ISBN: 1-58113-203-4.

* cited by examiner

FIG. 11
1100
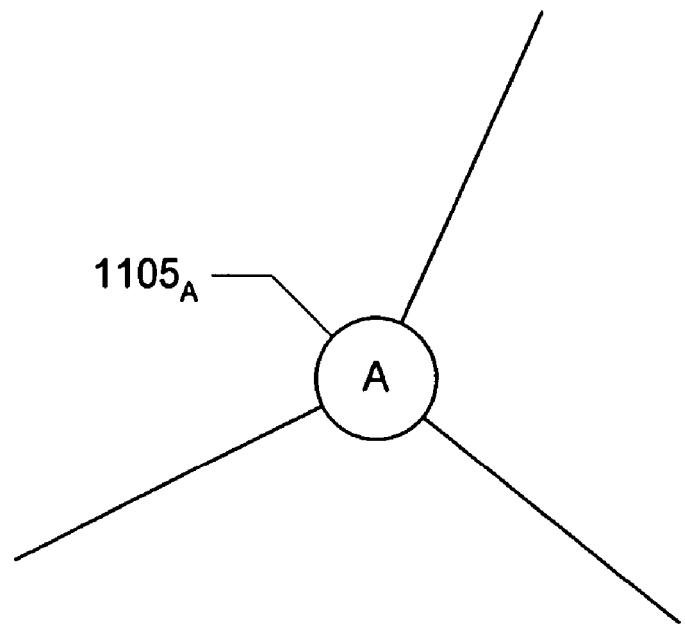
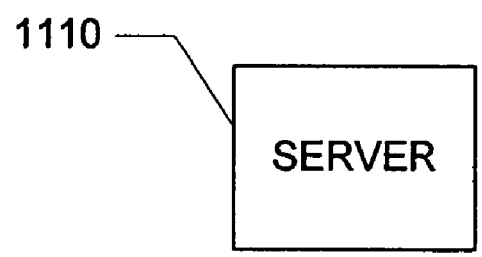

FIG. 18
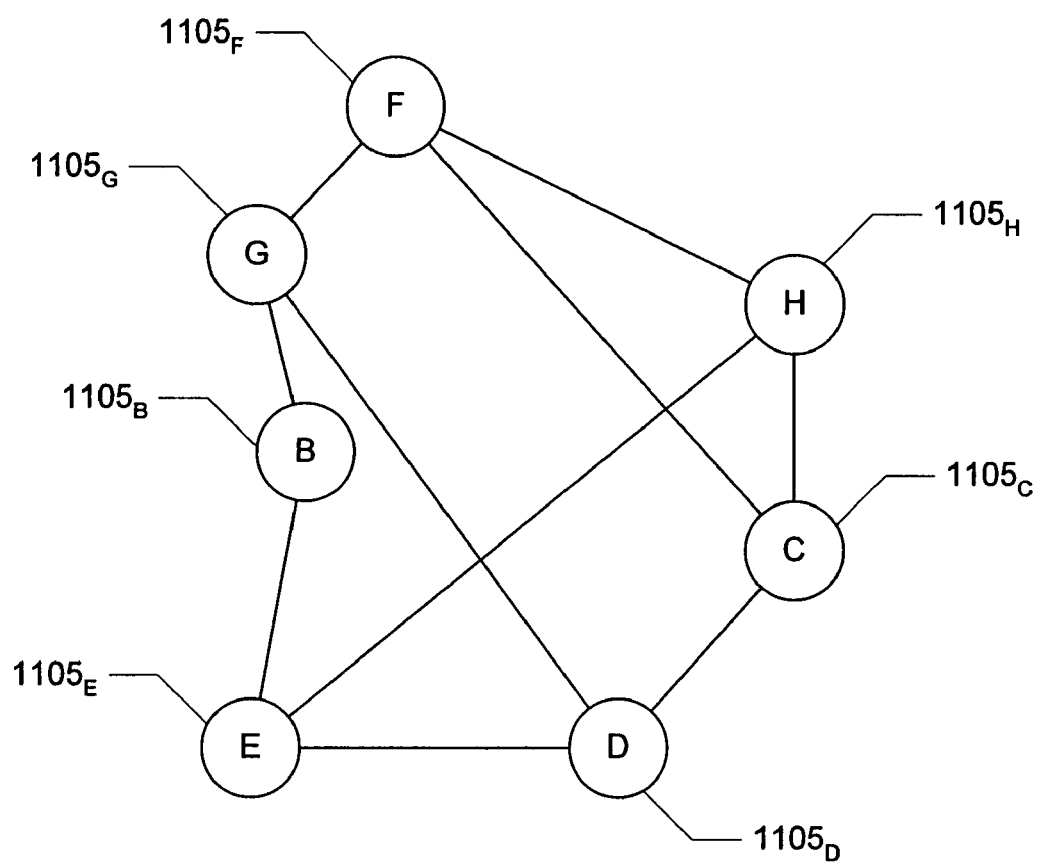
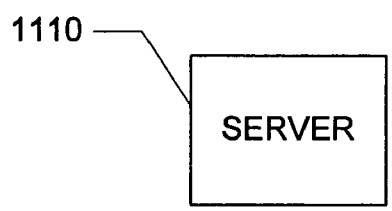

2700

METHOD OF MAINTAINING A PEER-TO-PEER RELAY NETWORK

This is a division of application Ser. No. 10/700,798, filed Nov. 3, 2003, now U.S. Pat. No. 7,627,678 which claims benefit to U.S. Provisional Application No. 60/513,098; filed Oct. 20, 2003, the entirety of which is incorporated herein by reference.

This application claims the benefit of U.S. Provisional Application No. 60/513,098 ("PEER-TO-PEER RELAY NETWORK"), filed Oct. 20, 2003, the disclosure of which is incorporated herein by reference.

BACKGROUND

In a typical client-server network, each of the clients in the network establishes a connection to a central server. A client requests services and data from the server. To communicate with another client, a client sends a request to the server. Typically, the clients do not establish direct connections to one another. In a client-server network with N clients, each client has 1 connection to the server, and the server has N respective connections to each of the clients. For example, as shown in FIG. 31A, in a client-server network with 6 clients, each client has 1 connection to the server, and the server has 6 respective connections to the clients.

In a typical peer-to-peer network (or "P2P network"), each member (or peer) in the peer-to-peer network establishes a connection to each of the other members. Using these direct peer-to-peer connections, the members send data to and request data from the other members directly, rather than using a centralized server (e.g., compared to a typical client-server network where members interact through the server). Typically, each member in the network has similar responsibilities in the network and the members are considered generally equivalent (as network members). In a peer-to-peer network with N peers, each peer has N−1 connections to other peers. For example, as shown in FIG. 31B, in a peer-to-peer network with 6 peers, each peer has 5 connections to other peers In some peer-to-peer networks, a server is also used by the members for some centralized services, such as address discovery (e.g., for establishing the connections for building the peer-to-peer network).

SUMMARY

The present invention provides methods and apparatus for implementing peer-to-peer relay. In one implementation, a peer-to-peer relay network includes: a plurality of N peer systems; wherein each peer system is connected to a number of other peer systems that is less than or equal to a connection limit, said connection limit is greater than or equal to 2, said connection limit is less than or equal to N−2, and each peer system is configured to relay data to peer systems connected to that peer system according to a set of one or more relay rules.

In another implementation, a server for a peer-to-peer relay network includes: means for establishing a peer-to-peer relay network; means for adding a peer system to a peer-to-peer relay network; means for maintaining a peer-to-peer relay network; and means for tracking connections in a peer-to-peer relay network.

In another implementation, a peer system for a peer-to-peer relay network includes: means for relaying data to any other peer systems connected to said peer system in a peer-to-peer relay network; means for establishing a peer-to-peer relay network; means for joining a peer-to-peer relay network; means for connecting to another peer system in a peer-to-peer relay network; means for maintaining a peer-to-peer relay network; and means for disconnecting from another peer system connected to said peer system in a peer-to-peer relay network.

In another implementation, a method of relaying data in a peer-to-peer relay network includes: receiving data at a relaying peer system from a sending peer system connected to said relaying peer system in a peer-to-peer relay network; applying a set of one or more relay rules to select zero or more peer systems indicated by said set of one or more relay rules to which to relay said data; and relaying said data to any peer systems selected by applying said set of one or more relay rules.

In another implementation, a method of adding a peer system to a peer-to-peer relay network includes: opening a connection between a server and a joining peer system; providing grid information to said joining peer system indicating one or more established peer-to-peer relay networks; receiving a grid selection from said joining peer system indicating a selected peer-to-peer relay network, wherein said selected peer-to-peer relay network has one or more member peer systems; providing network addresses of each of said one or more member peer systems to said joining peer system; and receiving a connection update from said joining peer system indicating to which member peer systems said joining peer system is connected; wherein each member peer system is connected to a number of other member peer systems that is less than or equal to a connection limit and each member peer system stores a set of one or more relay rules for relaying data to the other member peer systems connected to that member peer system.

In another implementation, a method of joining a peer-to-peer relay network includes: sending a join message from a joining peer system to each of one or more member peer systems in a peer-to-peer relay network; receiving a join response from at least one of said one or more member peer systems, wherein each join response is positive or negative, and a positive join response indicates the sending member peer system has an available connection and a negative join response indicates the sending member peer system does not have an available connection; selecting one or more member peer systems up to a connection limit according to a set of one or more connection rules; opening a connection with each selected member peer system; wherein each member peer system is connected to a number of other member peer systems that is less than or equal to said connection limit and each member peer system stores a set of one or more relay rules for relaying data to the other member peer systems connected to that member peer system.

In another implementation, a method of establishing a peer-to-peer relay network includes: opening a connection between said server and an establishing peer system, wherein the establishing peer system is one of said member peer systems; sending a request to create said peer-to-peer relay network from said establishing peer system to said server; receiving a creation confirmation at said establishing peer system from said server; wherein said establishing peer system stores a connection limit defining a number of other peer systems up to which said establishing peer system is permitted to connect, and said establishing peer system stores a set of one or more relay rules for relaying data to other peer systems connected to said establishing peer system.

In another implementation, a method of connecting peer systems in a peer-to-peer relay network includes: sending a connection available message from a disconnected peer system to one or more member peer systems in a peer-to-peer relay network when said disconnected peer system has a number of open connections to member systems that is less than a connection limit; receiving a connection available response from at least one of said one or more member peer systems, wherein each connection available response is positive or negative, and a positive join response indicates the sending member peer system has an available connection and a negative join response indicates the sending member peer system does not have an available connection; selecting a member peer system according to a set of one or more connection rules; opening a connection with said selected member peer system; wherein each member peer system is connected to a number of other member peer systems that is less than or equal to said connection limit and each member peer system stores a set of one or more relay rules for relaying data to the other member peer systems connected to that member peer system.

In another implementation, a method of maintaining a peer-to-peer relay network includes: sending a maintenance message from a peer system to each of one or more connected peer systems connected to said peer system in a peer-to-peer relay network; evaluating any responses received from said one or more connected peer systems; and closing the connection between said peer system and a connected peer system if the response from that connected peer system is not acceptable; wherein each peer system is connected to a number of other peer systems that is less than or equal to a connection limit and each peer system stores a set of one or more relay rules for relaying data to the other peer systems connected to that peer system.

BRIEF DESCRIPTION OF THE DRAWINGS

FIGS. 11-18 illustrate an example of one implementation of building, adjusting, and maintaining a grid.

DETAILED DESCRIPTION

The present invention provides methods and apparatus for implementing peer-to-peer relay. In one implementation, a plurality of computer systems is connected to form a peer-to-peer network. Each computer system is connected to up to a predetermined number of other computer systems. To communicate, a computer system sends a message to each of the connected systems. When a computer system receives a message from another computer system, the receiving computer system sends or relays the message to other computer systems according to the relay procedures or rules for that peer-to-peer relay network. Following the relay rules, the messages propagate throughout the network to all the member computer systems.

Figure 1:
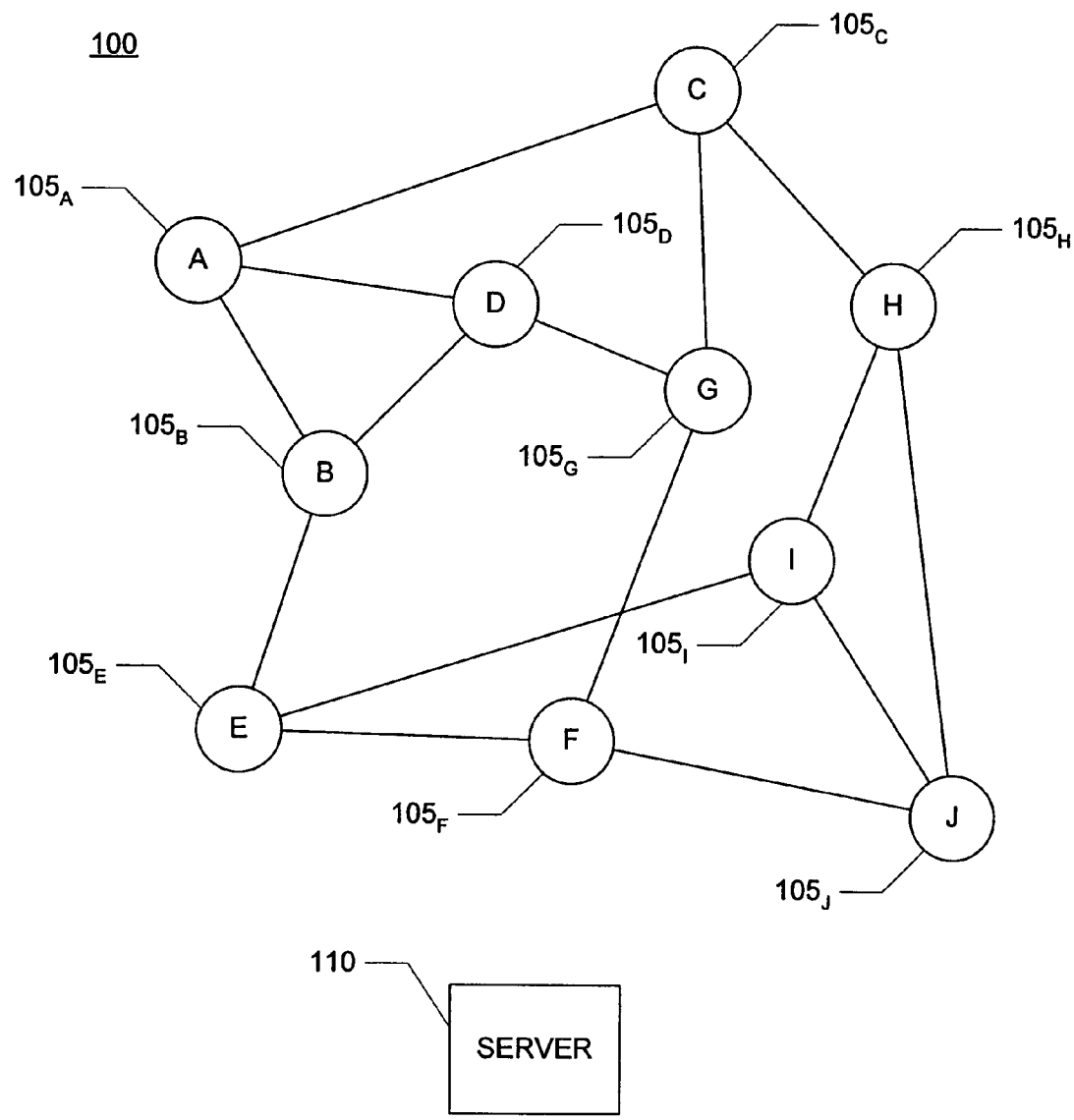
FIG. 1 shows a representation of one implementation of a peer-to-peer relay network.

FIG. 1 shows a representation of one implementation of a peer-to-peer relay network 100. A peer-to-peer relay network can also be referred to as a "grid." In FIG. 1, a group of 10 peer systems $105_{A \ldots J}$ (also referred to as "peers") are connected to form a peer-to-peer relay network. Each peer system 105 is a network-enabled game console, such as a PlayStation 2™ game console with a network adapter, as offered by Sony Computer Entertainment Inc. The peer systems 105 are connected directly (e.g., wired or wireless connections) or indirectly (e.g., through an intranet or a public IP network such as the Internet). In one implementation, the peer systems 105 are connected using UDP or TCP connections. The peer systems 105 exchange data to support a network environment or activity, such as a chat environment or an online game.

Each peer 105 also has a connection to a central server 110, such as a UDP or TCP connection through the Internet (the connections to the server 110 are not shown in FIG. 1). The server 110 is a server computer system providing centralized services to the connected peer systems 105. In one implementation, the server provides an address directory of peer systems and tracks which peer systems are connected with which. Examples of other server services include, but are not limited to: authentication, player matching, and tracking peer system addresses. As described below, in some implementations, the server can support multiple independent or related peer-to-peer relay networks. In one implementation, the server supports multiple environments or worlds, dividing or grouping clients into the environments and filtering data appropriately. In one implementation, the server includes one or more aspects of the servers described in co-pending and commonly assigned U.S. patent application Ser. Nos. 10/211,075 ("Configuration Switching: Dynamically Changing Between Network Communication Architectures"), filed Jul. 31, 2002, and 10/211,129 ("Multi-User Application Programming Interface"), filed Jul. 31, 2002, the disclosures of which are incorporated herein by reference. In another implementation, the peers do not use a centralized server (e.g., building the grid through direct communication and relaying data).

The network 100 has a connection limit of 3. The connection limit is set by the server and defines the maximum number of connections each peer 105 is permitted to have in the grid. In another implementation, one peer (e.g., the peer establishing the grid) sets or multiple peers negotiate the connection limit. In FIG. 1, the connection limit is 3 and each peer 105 has 3 connections. Peer systems A-J each have 3 connections to other peers (peer system $105_A$ is also referred to as peer system A or peer A). The network 100 is a 3-connection peer-to-peer relay network so each peer 105 has 3 connections to other peers.

The peers 105 communicate by broadcasting messages throughout the network 100. The peers 105 propagate the messages by relaying received messages to connected peers 105 according to the relay rules of the network 100. In this implementation, the relay rules define that a peer 105 relays a message to each of the peers 105 connected to the peer 105, with two exceptions: (i) a peer 105 does not relay a message that the peer 105 has already relayed, and (ii) a peer 105 does not relay a message back to the peer 105 from which the relaying peer 105 received the message. In one implementation, a peer 105 also does not relay a message to a peer 105 from which the relaying peer 105 has already received the message (e.g., when the relaying peer 105 receives the message from multiple peers 105 before the relaying peer 105 has relayed the message). In other implementations, different or additional rules can be used. The relay rules (and other rules) are established by the server or are pre-set in the peer systems (or their system software). In another implementation, the rules can be modified dynamically, such as by propagating messages with rule updates throughout the grid.

In one application of the network 100, the peers 105 are playing a network game. In the course of the game, a peer 105 generates an update message reflecting actions or events caused by the peer 105. For example, during the execution of the game software on a player's computer system (e.g., peer A), the computer system generates update data to be used by other players' computer systems representing actions in the game such as moving or shooting (e.g., updating the position of a player). For the update to be effective, each of the peers 105 needs to receive the update from the updating peer 105. The peers 105 relay the update messages throughout the network 100 to propagate the message to each peer 105.

In one example, peer A has an update to send to the other peers. Peer A builds an update message including the update data, an identifier indicating peer A is the source of the update, and a sequence identifier to differentiate this message from others sent out by peer A and provide a relative sequence. Peer A sends the message to its connected peers: B, C, D. Peer B sends the message received from peer A to peers D and E. Peer B does not send the message to peer A because peer B received the message from peer A. Similarly, peer C sends the message from peer A to peers G and H, and peer D sends the message from peer A to peers B and G. When peer B receives the message from peer D, peer B does not relay the message again because peer B recognizes that this is the same message (using the identifiers of the message). Similarly, peer D does not relay the message received from peer B. Assuming that the connections between peers are substantially the same in terms of the amount of time to transfer a message between peers, in the next set of relays, peer E relays the message from peer B to peers F and I, peer G relays the message from peer C to peers D and F (or relays the message from peer D to peers C and F, depending on which message arrived at peer C first), and peer H relays the message from peer C to peers I and J. At this time, every peer has received the update message from peer A. However, peers F, I, and J have just received the message, so these peers will relay the message. Peer F relays the message from peer E to peers G and J (or from peer G to peers E an J, whichever arrived first), peer I relays the message from peer E to peers H and J (or from peer H to peers E and J, whichever arrived first), and peer J relays the message from peer H to peers F and I. By this time, all of the peers have sent or relayed the message once. Because the peers will not relay the same message again, the propagation of this message ends.

In this way, the message propagates throughout the peer-to-peer network 100. This propagation of update information among the peer systems 105 participating in the game supports the game and game environment. The peer systems 105 can distribute data throughout the network 100 without using the centralized server 110 for distribution. In addition, each peer 105 is not directly connected to every other peer 105, saving resources. As a result, the grid 100 limits each peer's network bandwidth requirement (since it only needs to communicate with a limited number of other clients) while allowing data from any single client to quickly spread to every other peer in the grid (e.g., using UDP sockets).

In other implementations, a peer-to-peer relay network includes more or less peer systems and the network has a different connection limit. Depending upon the number of peers, the connection limit, and the rules for establishing connections, not all peers may have all their connections filled and so there may be a peer (or more) with an available connection.

In another implementation, the connection limit can vary. In one implementation, the connection limit is specific to each peer system, with some, all, or none of the peers having different connection limits. Each peer sets its connection limit, or is assigned a connection limit by a server. In one example, peers X and Y each have a connection limit of 5, and peer Z has a connection limit of 4, and the remaining peers each have a connection limit of 3. In another implementation, the connection limit is dynamic. In this case, the server adjusts the connection limit for the peers, such as based on network performance (e.g., when network traffic is low, the connection limit is low). In another implementation, one or more of the peer systems each adjust their respective connection limit dynamically. Alternatively, the server adjusts the connection limit for specific peer systems dynamically (e.g., adjusting some but not all).

Figure 2:
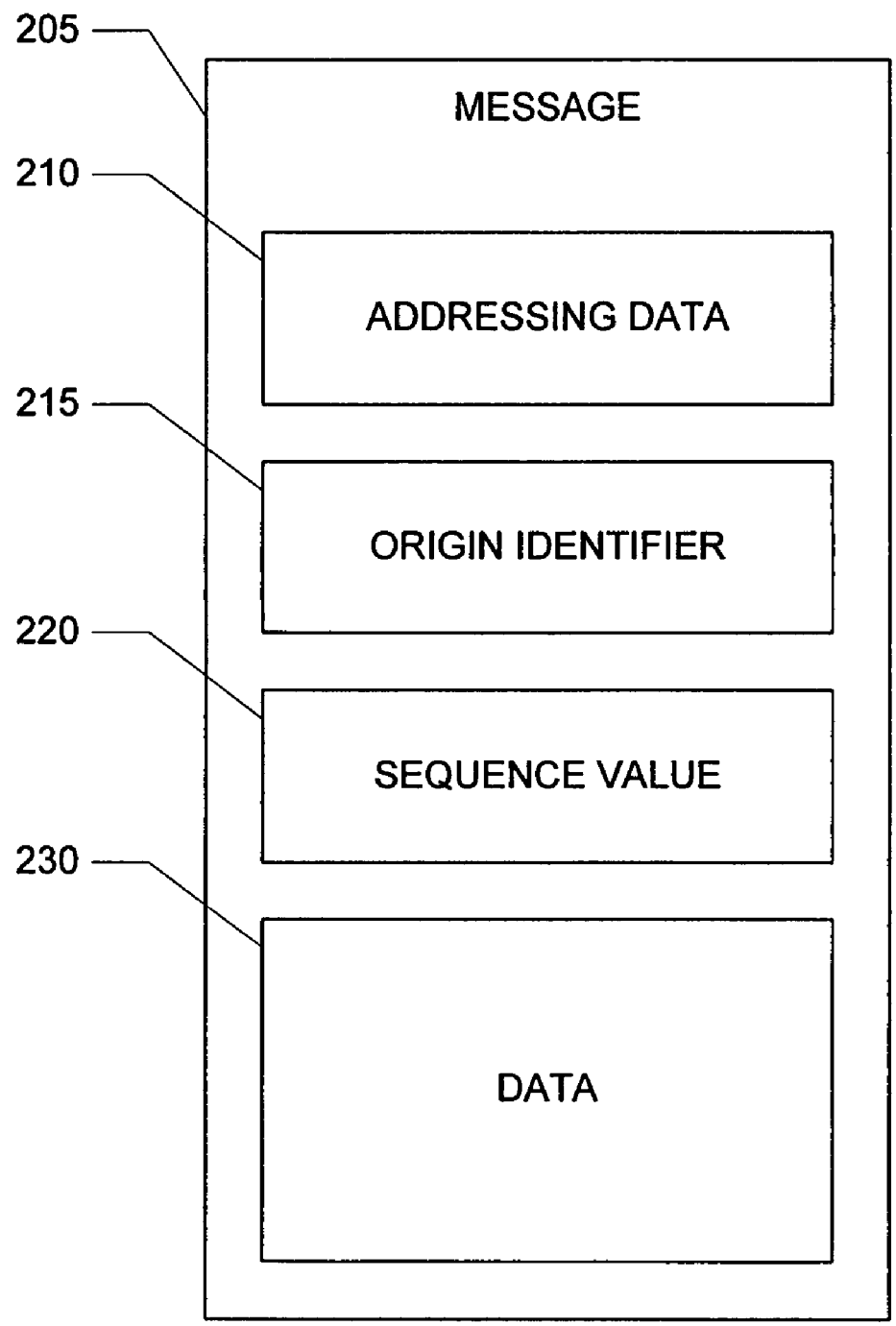
FIG. 2 shows a block diagram of one implementation of a message.

FIG. 2 shows a block diagram of one implementation of a message 205. The message 205 is built by a peer system to be sent to other peers in a peer-to-peer relay network. For example, referring to FIG. 1, when peer A has an update message to send to the other peers, peer A builds a message such as the message 205. The message 205 includes: addressing data 210, an origin identifier 215, a sequence value 220, and payload data 230. The addressing data 210 includes network addressing information to send the message 205 from the peer to another peer. In one implementation, the addressing data 210 includes an IP address for the sending peer and an IP address for the intended recipient peer. The origin identifier 215 identifies the peer that built the message 205. This identifier 215 indicates to peers throughout the peer-to-peer relay network the origin of the message propagating through the network. Using the origin identifier 215, a peer receiving the message 205 can determine from which peer in the network the message 205 originated. The sequence value 220 identifies the specific message 205 and provides relative sequence information. Using the sequence value 220, a peer receiving the message 205 can determine whether a particular message has already been received and can determine the order or sequence of messages sent from the peer indicated by the origin identifier 215. The data 230 is the payload data for the message 205. For an update message (e.g., in a game), the payload data 230 is the update data to be used by the recipient peers. In alternative implementations, different types of messages can be used, and messages with different formats from that shown in FIG. 2 can be used (e.g., including different or additional information). For example, a message can include a file or part of a file or frame of data such as a frame of game data or a frame or part of an audio file being published to the members of the grid. The receiving peers could reconstruct the whole file using the sequence value included in each of the messages. In another example, a message includes additional identification information, such as an identifier indicating to which grid the message belongs for relaying by peers belonging to multiple grids.

Figure 3:
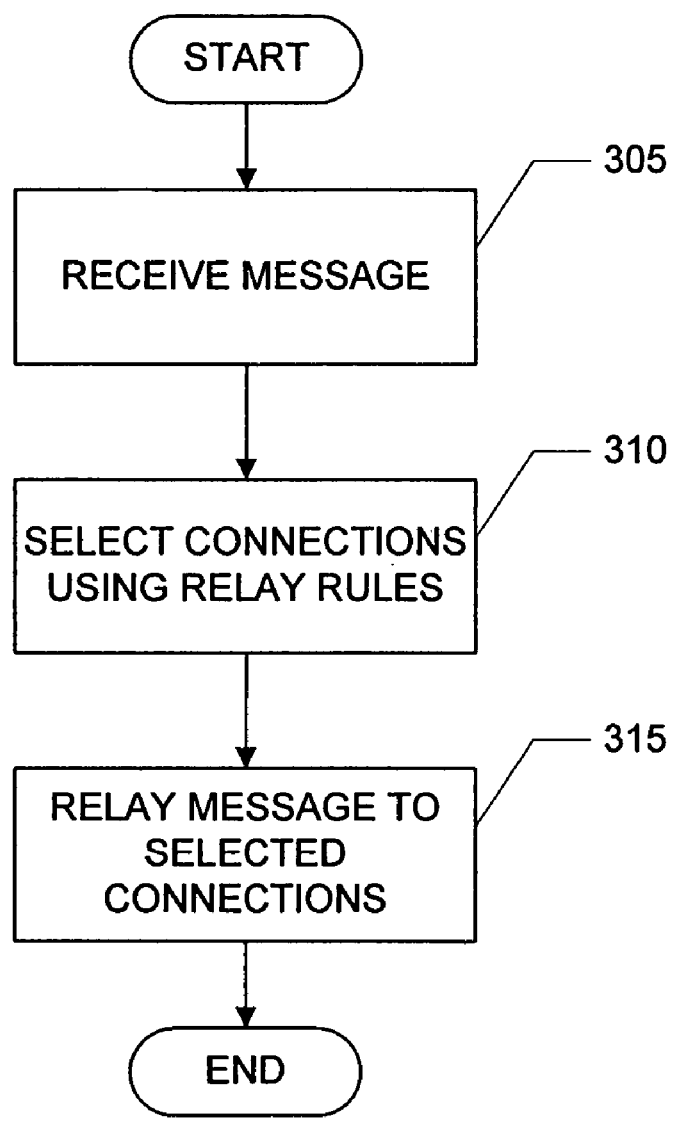
FIG. 3 shows a flowchart of one implementation of a peer relaying a message in a peer-to-peer relay network.

FIG. 3 shows a flowchart 300 of one implementation of a peer relaying a message in a peer-to-peer relay network. Initially, the peer is connected to one or more other peer systems in a peer-to-peer relay network.

The peer receives a message from a sending peer through a connection between the peer and the sending peer, block 305. The message includes an origin identifier, a sequence value, and payload data (e.g., update data), as in the message shown in FIG. 2.

The peer selects connections to which to relay the received message, block 310. The peer selects the connections from the available connections of the peer according to the relay rules for the peer-to-peer relay network. After applying the relay rules, the peer may have selected some, none, or all of the peer's connections.

The peer relays the message to each of the selected connections, block 315. The peer builds a message for each selected connection. For each message to send, the peer uses the received message but updates the addressing information as appropriate (e.g., changing the sender to the peer and the recipient to the recipient peer for the connection). Accordingly, the payload data remains the same. In another implementation, a peer can also add data to the message or change data in the message. The peer sends the built messages to the appropriate recipients.

Figure 4:
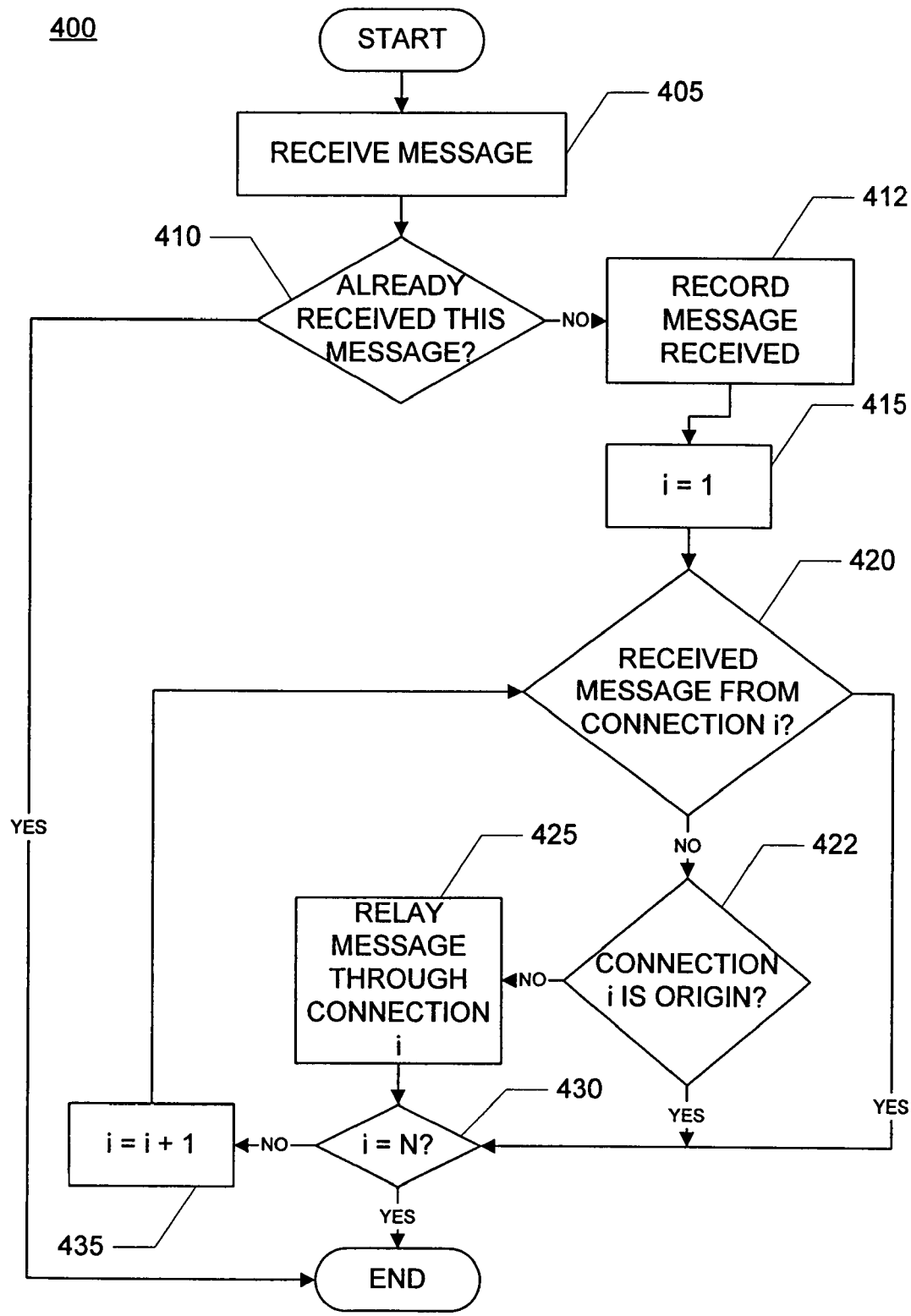
FIG. 4 shows a flowchart of one implementation of a peer relaying a message in a peer-to-peer relay network according to a set of relay rules.

FIG. 4 shows a flowchart 400 of one implementation of a peer relaying a message in a peer-to-peer relay network according to a set of relay rules. The relay rules used in FIG. 4 are an example of one set of relay rules. Other implementations can use different or additional relay rules. Initially, the relaying peer is connected to N other peer systems in a peer-to-peer relay network. For example, in the network shown in FIG. 1, peer D is connected to 3 other peers (and so N=3 in this case). The relay rules for FIG. 4 for relaying a message are:
1. Do not relay the message twice
2. Do not relay the message back to the sender
3. Do not relay the message to the origin peer
4. Relay the message to the peers on the connections available after applying rules 1 and 2

The relaying peer receives a message, block 405. The relaying peer determines whether the relaying peer has already received this message, block 410. The relaying peer compares identification data for the message with data stored by the relaying peer for messages already received. In one implementation, each peer maintains a received message table of origin identifiers and sequence values for messages that have been received. The relaying peer retrieves the origin identifier and sequence value from the received message and compares this information with data stored in the relaying peer's received message table. If the relaying peer determines that the relaying peer has previously received this received message (e.g., the peer finds an entry in the received message table storing the origin identifier and sequence value of the received message), the relaying peer does not relay the received message. In another implementation, the relaying peer checks to determine if the relaying peer has previously relayed the received message.

If the relaying peer determines that the relaying peer has not previously received this message, the relaying peer records that the message has been received, block 412. In one implementation, the relaying peer adds an entry to the relaying peer's received message table for the origin identifier and sequence value of the received message. If the table already has an entry for this origin identifier and sequence value, the relaying peer does not change the table.

After recording that the message has been received, the relaying peer sets a counter, block 415. The relaying peer uses the counter to step through each of the relaying peer's available connections. In one implementation, the relaying peer sets an integer counter i to 1.

The relaying peer determines whether the relaying peer received the message from the peer connected to the connection indicated by the counter, block 420. The received message includes addressing information indicating the sender of the received message. The counter indicates a connection and so indicates a connected peer and that peer's addressing information. For example, peer D in FIG. 1 has 3 connections and peer D has assigned a number to each connection: peer A is connected to connection 1, peer B is connected to connection 2, and peer G is connected to connection 3. So, when the counter i is 1, peer D checks to see if the received message was sent by peer A by comparing the addressing information (the sender) for the received message with the addressing information for peer A stored by peer D. If the received message was sent to the relaying peer by the peer connected to the connection indicated by the counter the relaying peer does not relay the message to that peer.

If the received message was not sent to the relaying peer by the peer connected to the connection indicated by the counter, the relaying peer determines whether the peer connected to the connection indicated by the counter is the origin peer system for the received message, block 422. The received message includes information indicating the peer that is the origin of the received message (the peer that generated the data of the message originally, recall the origin identifier 215 of FIG. 2). If the peer connected to the connection indicated by the counter is the origin peer system for the received message the relaying peer does not relay the message to that peer.

If the received message was not sent to the relaying peer by the peer connected to the connection indicated by the counter and the peer connected to the connection indicated by the counter is not the origin peer system for the received message, the relaying peer relays the message to that connected peer, block 425. The relaying peer builds a message for the indicated connection. The relaying peer makes a copy of the received message and updates the addressing information as appropriate (e.g., changing the sender to be the relaying peer and the recipient to be the connected peer connected to the indicated connection). Accordingly, the payload data remains the same. The relaying peer sends the built messages to the connected peer through the indicated connection.

The relaying peer determines whether all the connections have been checked, block 430. The relaying peer compares the counter to the number of connections established by the relaying peer in the peer-to-peer relay network. For example, the relaying peer compares the counter i to the value of N (the number of connections held by the relaying peer). If the relaying peer has checked all the connections, the relaying peer has completed relaying for this received message.

If the relaying peer has not checked all the connections, the relaying peer increments the counter, block 435. For example, the relaying peer sets the counter i to be i+1. After incrementing the counter, the relaying peer determines whether the relaying peer received the received message from the peer connected to the connection indicated by the incremented counter, returning to block 420.

As noted above, in other implementations, different, additional, or fewer relay rules can also be used. In one implementation, the relaying peer does relay the message back to the sender (e.g., so the sender can confirm that the relaying peer did not change the data). In another implementation, the relaying peer does not relay the message to the peer that is indicated as the origin of the message (e.g., as indicated by the origin identifier of the message). In another implementation, the relaying peer does not relay the same message to the same connected peer again. In another implementation, the relaying peer selects a subset of the available connections to relay the message, such as selecting the peers with the lowest and highest response times. In another implementation, each peer relays the message to all the peer's connected peers subject to a hop count stored in the message so that the message will only be relayed a certain number of times. In another implementation, a peer relays the same message a limited number of times (more than once).

Figure 5:
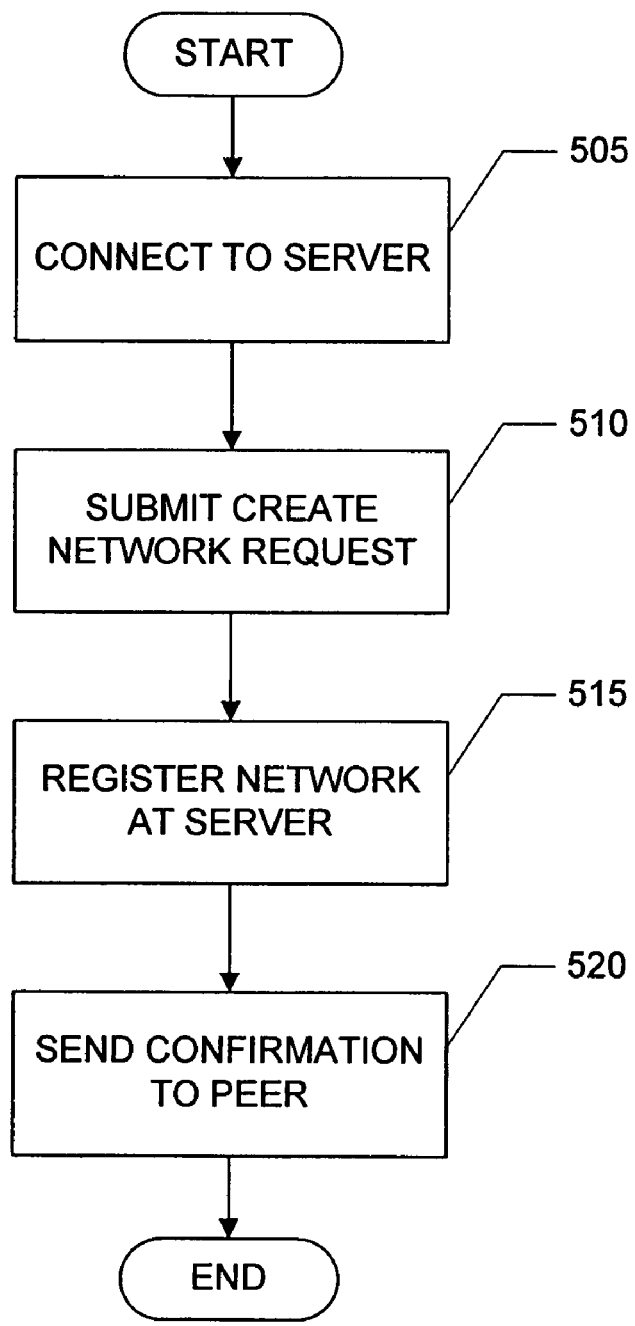
FIG. 5 shows a flowchart of one implementation of establishing a peer-to-peer relay network.

FIG. 5 shows a flowchart 500 of one implementation of establishing a peer-to-peer relay network. Initially, a peer system and a server are deployed, such as peer A and the server 110 in FIG. 1. The peer system opens a connection to the server, block 505. The peer system is connecting to the server to establish a peer-to-peer relay network (or grid) and can be referred to as an "establishing peer." The connection to the server can be direct or an indirect network connection. In one implementation, the peer is assigned to or joins and registers in a subsection of the space or one of multiple worlds or environments maintained by the server. The server authenticates the peer before allowing the peer to interact further. The peer system submits a create grid request to the server, block 510. The create grid request indicates the peer's identification information and that the peer is requesting the server to establish a new peer-to-peer relay network. In one implementation, the request also includes conditions that the peer requests the server to apply (e.g., restrictions on joining the grid). In another implementation, the request indicates a connection limit and a set of rules for use in the grid (e.g., relay rules and connection rules). The server registers the new grid, block 515. The server maintains tables or lists of data tracking the established grids. The server creates a new table for the new grid and adds the requesting peer to the table. The server sends confirmation to the peer that the grid has been established, block 520. The confirmation includes any identification or access information the peer needs to access the grid. In one implementation, the confirmation includes the connection limit and the rules for the grid (e.g., relay rules).

Figure 6:
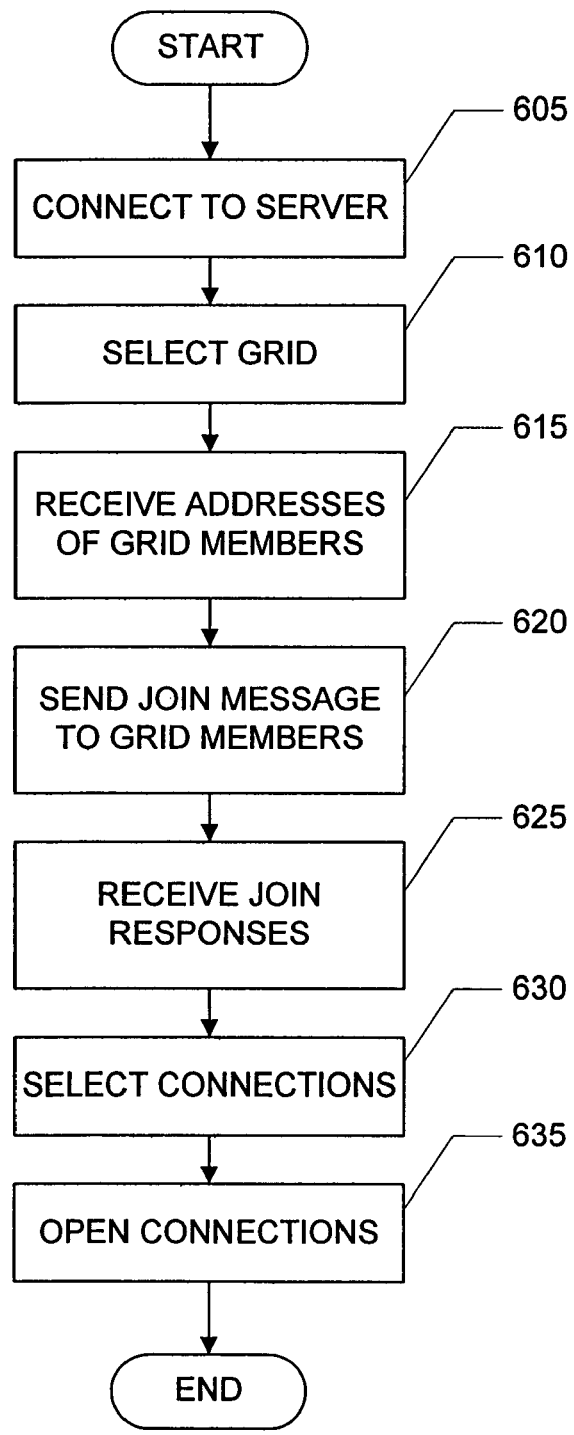
FIG. 6 shows a flowchart of one implementation of connecting a peer to a peer-to-peer relay network.

FIG. 6 shows a flowchart 600 of one implementation of connecting a peer to a peer-to-peer relay network. Initially, a peer-to-peer relay network has been established by a peer and server, such as peer A and the server 110 in FIG. 1.

A peer system connects to the server, block 605. The peer system is connecting to the server to join a peer-to-peer relay network (or grid) and can be referred to as a "new peer" or "joining peer." The connection to the server can be direct or an indirect network connection. In one implementation, the peer is assigned to or joins and registers in a subsection of the space or one of multiple worlds or environments maintained by the server. The server authenticates the peer before allowing the peer to interact further.

The peer selects a grid from the available grids of the server, block 610. In one implementation, the peer requests a list of available grids and selects from that list. In another implementation, the server supplies the list of available grids automatically when the peer connects to the server. In one implementation, the server provides a list of available grids for the world in which the peer has registered. The server can also provide additional information to assist in the selection (e.g., which peers are already members of each grid). The peer submits the grid selection to the server.

The server sends the addresses of the peers that have already joined the selected grid, block 615. The addresses indicate how to communicate with the grid members (e.g., IP addresses). The addresses are for establishing peer connections with the grid members; not connections through the server. If the selected grid has restricted access and the new peer is not permitted to join the selected grid, the server does not provide the addresses to the peer and offers to let the peer select a different grid. In one implementation, the server provides the connection limit and rules for the selected grid with the addresses to the new peer.

The new peer sends a join message to each of the grid members, block 620. The join message indicates the address of the new peer and that the peer is new to the grid. In another implementation, the new peer sends a connection available message indicating the peer's address and the number of connections the peer has available (similar to when a peer loses a connection, as described below). In another implementation, the new peer sends a join message to one grid member and that grid member begins to relay the join message through the grid.

The grid members receive the join message and each sends a join response back to the new peer, block 625. A join response indicates whether the responding peer has any available connections or not. A positive response indicates that the responding peer has an available connection. A negative response indicates that the responding peer does not have an available connection. The responding peers record the new peer's address from the join message and use that address to send the join responses. The new peer receives the join responses.

The new peer selects which of the grid members to which to connect, block 630. The new peer uses a set of connection rules to select peers for connection. For example, in one implementation, the new peer selects from the peers sending positive responses a number of peers up to the connection limit for the grid in the order the positive responses were received by the new peer (e.g., for a connection limit of 3, the new peer selects the peers corresponding to the first three positive responses received). Different implementations can use different sets of connection rules. The new peer stores the response times for each of the selected peers. In another implementation, the new peer stores the response times for all the responses (positive and negative).

After selecting the peers for connection, the new peer opens connections to the selected peers, block 635. The new peer sends a connection request to each of the selected peers and the selected peers confirm the request, opening the connections (unless connections have become unavailable for the selected peers). The connections between peers can be direct or indirect (e.g., across a network, such as the Internet). In one implementation, when peers open a connection, each peer informs the server of the connection.

In another implementation, the server facilitates joining the grid by forcing one or more connections. The server can cause one peer to close a connection and open a connection to another indicated peer. The server can also cause a peer to close one or more of its connections.

Figure 7:
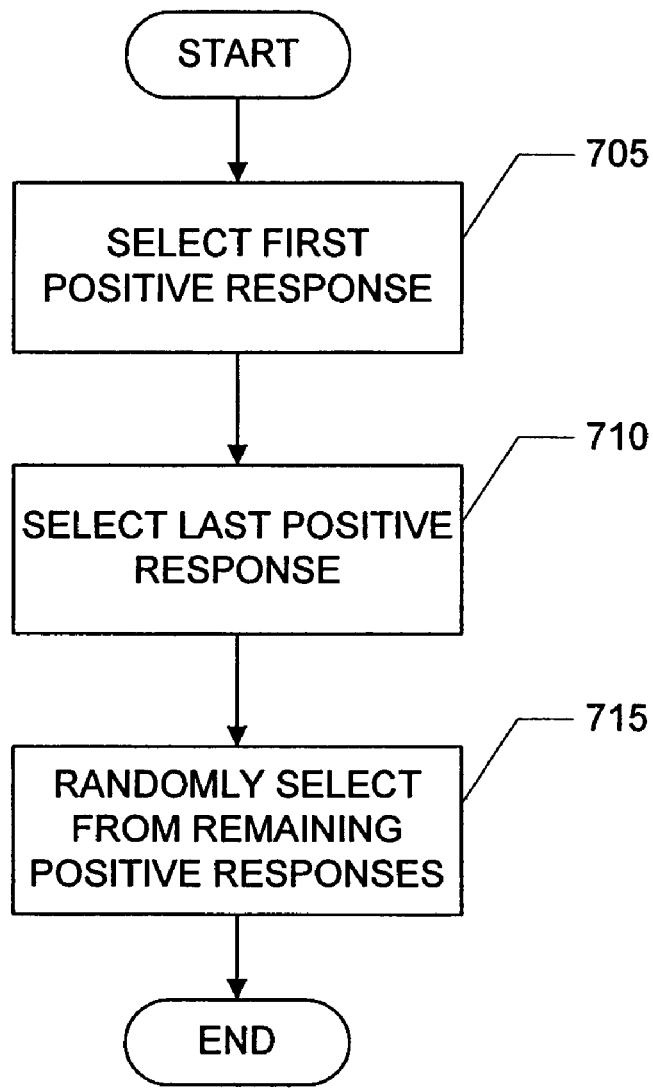
FIG. 7 shows a flowchart of one implementation of selecting peers for joining a peer-to-peer relay network.

FIG. 7 shows a flowchart 700 of one implementation of selecting peers for joining a peer-to-peer relay network, such as in block 630 of FIG. 6. Initially, a new peer has selected a grid and sent out join messages to the member peers of that grid. The new peer has received join responses back from the member peers.

The new peer selects the peer corresponding to the first received positive response, block 705. This positive response was received before the others and represents the fastest available connection. The new peer selects the peer corresponding to the last received positive response, block 710. This positive response was received after the others and represents the slowest available connection. To determine which response is last, the new peer waits until all responses have been received or for a defined period of time and then declares the last received in that period to be the last. The new peer randomly selects peers from the remaining positive responses until the new peer has selected a number of peers equal to the connection limit, block 715. These selections support an even distribution of fast and slow connections through the grid.

As noted above, in various implementations, different or additional connection rules can be used. In one implementation, the new peer selects the peers for the first and last positive responses and then selects the peers corresponding to positive responses in increasing order of response time (after the first). In another implementation, the new peer selects peers as the responses arrive (e.g., reserving one space for the last received positive response), rather than waiting to begin selecting peers. In another implementation, the new peer selects peers using a response time threshold (e.g., do not select peers with a response time above some limit). In another implementation, the new peer selects peers based on characteristics of the peers (using information provided in the join responses), such as storage capacity, processing speed, access levels, or available functions.

In one implementation, a peer system classifies the connections according to the selection process used for selecting those connections. For example, a peer stores information indicating which of the open connections corresponds to the join response received with the lowest response time and which of the open connections corresponds to the join response received with the highest response time. As connections are adjusted for peers disconnecting and new peers joining the grid, the peer can adjust the stored classifications of connections.

In another implementation, the new peer uses the server to assist in opening connections. In one implementation, the server provides a list of grid members with available connections and those member peers' addresses. The new peer sends the join messages directly to the indicated grid members.

If there are fewer positive responses than the connection limit, the new peer will have remaining available connections. In one implementation, the new peer can force another peer to close an established connection and open a connection with the new peer.

Figure 8:
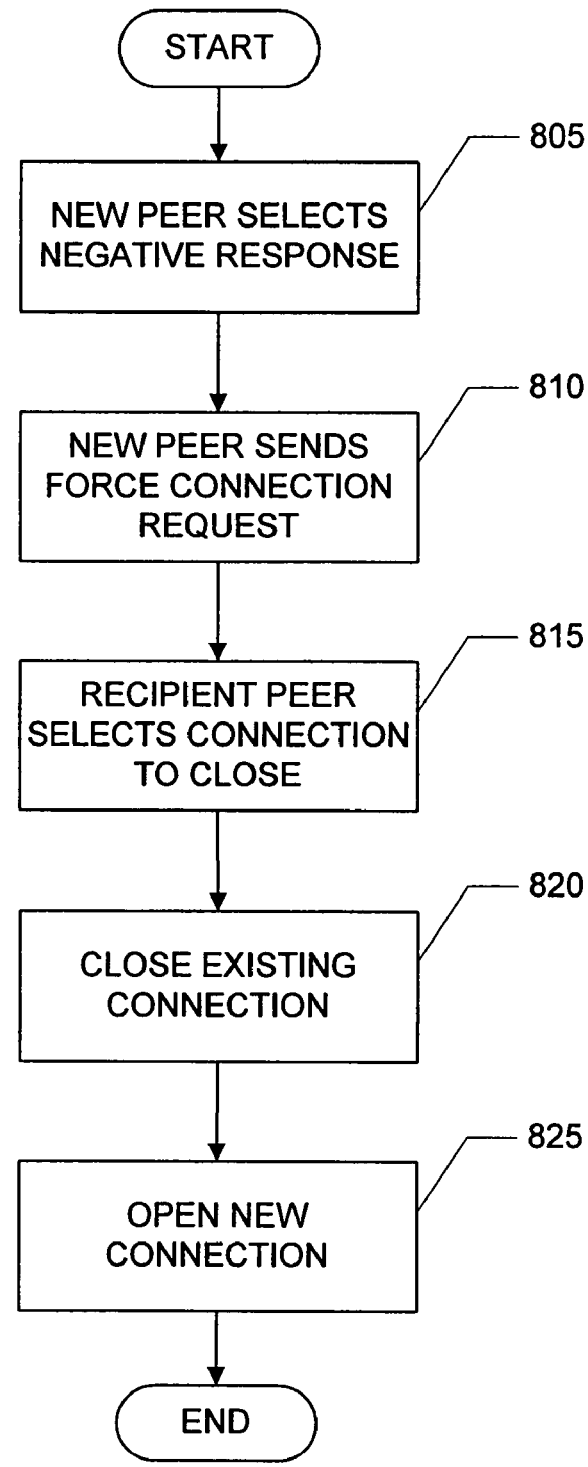
FIG. 8 shows a flowchart of one implementation of forcing a peer to give a connection to a new peer in a peer-to-peer relay network.

FIG. 8 shows a flowchart 800 of one implementation of forcing a peer to give a connection to a new peer in a peer-to-peer relay network. Initially, a new peer has selected a grid and sent out join messages to the member peers of that grid. The new peer has received join responses back from the member peers. However, after selecting the peers for all the positive responses, the new peer still has available connections.

The new peer selects a peer corresponding to a negative response, block 805. The new peer selects a negative response using the same connection rules for positive responses (e.g., the first received negative response according to the rules from FIG. 7). Alternatively, the new peer uses a different set of force connection rules. The new peer does not select a peer to which the new peer is already connected.

The new peer sends a force connection request to the selected peer, block 810. The force connection request indicates that the new peer has at least one available connection (or specifically how many) and that the recipient peer is to open a connection with the new peer.

The new peer receives the force connection request and selects a connection to close, block 815. The recipient peer selects a connection to close using the connection rules in reverse. For connection rules based on response time, the recipient peer uses the stored response times from join responses (and connection available responses, as described below). In one implementation, to select among randomly selected peers, the recipient peer selects the last peer selected, or again randomly selects a peer. In another implementation, the recipient peer uses a different set of forced disconnection rules.

The recipient peer closes the selected connection, block 820. The recipient peer sends a close message to the peer connected to the selected connection and the two peers close the connection. The peer connected to the selected connection now has an available connection and sends out a connection available message to the grid, as described below.

The recipient peer sends a confirmation to the new peer, and the two peers open a new connection, block 825. The new peer now has one less available connection. If the new peer has more available connections, the new peer repeats the process, returning to block 805 to select another negative response.

In another implementation, the new peer does not force another peer to open a connection unless the new peer has at least two available connections. Alternatively, a different threshold can be used (e.g., three). In another implementation, the new peer sends a force connection message when the new peer does not have at least some number of connections (a connection floor).

In another implementation, the recipient peer for a force connection message has the option to decline (e.g., depending on network load balancing). If declined, the new peer selects another peer to which to send a new force connection message.

In another implementation, if a new peer has two or more available connections and is sending a force connection message, the new peer includes information in the message indicating that the new peer has two available connections. When the recipient peer has selected a connection to close, the recipient peer indicates to the connected peer for the selected connection (the remote peer) that the new peer has another available connection (and includes the address of the new peer if appropriate). After the recipient peer has closed the connection with the remote peer, the remote peer sends a connection available message directly to the new peer (unless the new peer is already connected to the remote peer). The new peer opens a new connection with the recipient peer (selected by the new peer) and another new connection with the remote peer (selected by the recipient peer). In this way, the new peer can quickly establish two connections. If the new peer still has another two available connections, the new peer can again send a force connection message indicating two available connections to another selected recipient peer.

When a peer system disconnects from another peer system, each of the peers then has an available connection. If one (or both) of these peers is still in the grid (i.e., has not disconnected from the grid), the peer sends out a connection available message to the peer's remaining connected peers to be relayed through the grid to all the other peers in the grid.

Figure 9:
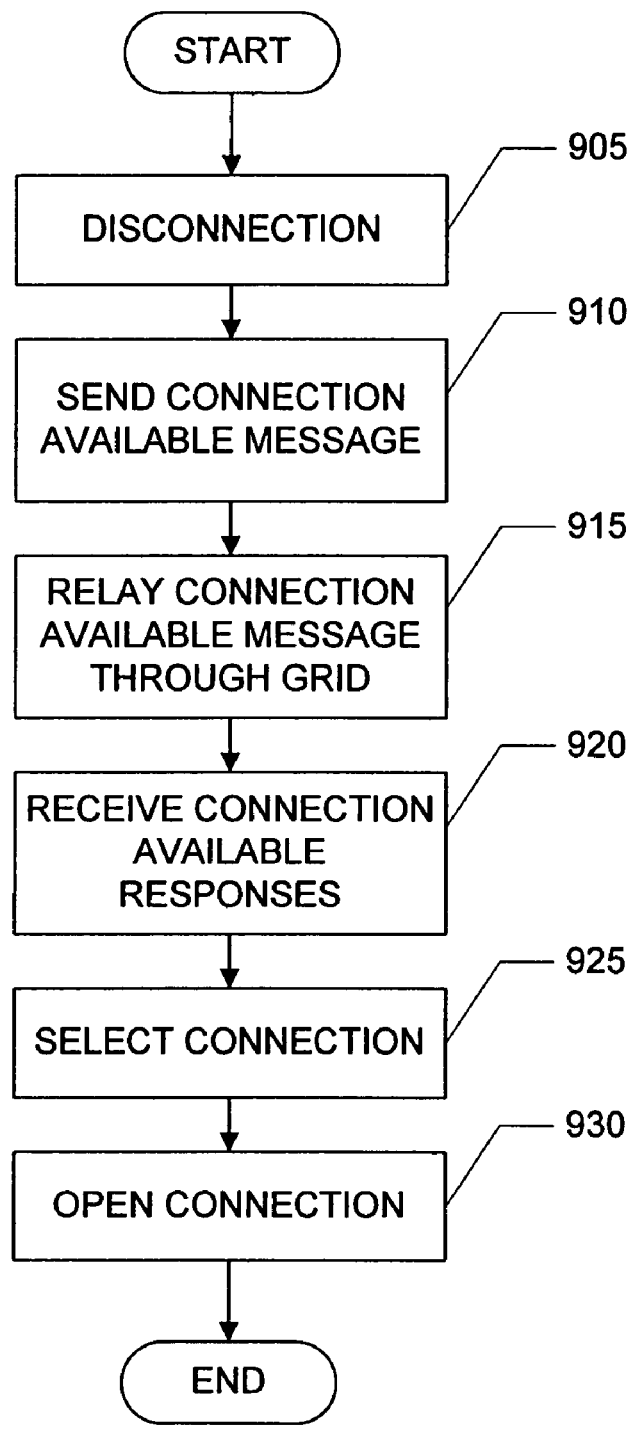
FIG. 9 shows a flowchart of one implementation of disconnection in a peer-to-peer relay network.

FIG. 9 shows a flowchart 900 of one implementation of disconnection in a peer-to-peer relay network. Initially, a peer system (the disconnected peer) is connected to at least two other peer systems in a peer-to-peer relay network.

The disconnected peer becomes disconnected from one of the peers to which the disconnected peer was initially connected, block 905. The disconnection can occur because of a voluntary disconnection on either end or a failure in the connection itself (e.g., part of the path between the peers fails). For example, a voluntary disconnection can occur when the peer determines that a connected peer is non-responsive (as described below) or when the peer is forced to open a connection with a new peer (as described above). In one implementation, the server can cause a peer to close one or more connections resulting in corresponding disconnections.

The disconnected peer sends a connection available message to the peers remaining connected to the disconnected peer, block 910. The connection available message indicates that the disconnected peer now has an available connection. In another implementation, the connection available message indicates the number of connections the peer has available.

The peers connected to the disconnected peer relay the connection available message, block 915. The peers in the grid send connection available responses back to the disconnected member, block 920. A connection available response indicates whether the responding peer has any available connections or not. A positive response indicates that the responding peer has an available connection. A negative response indicates that the responding peer does not have an available connection. The responding peers record the new peer's address from the join message and use that address to send the join responses. Alternatively, the responding peers send the responses back through the grid to be relayed to the disconnected peer. The disconnected peer receives the connection available responses.

The disconnected peer selects one of the grid members to which to connect, block 925. The disconnected peer uses the connection rules to select a peer for connection, but the disconnected peer does not select a peer to which the disconnected peer is already connected. For example, in one implementation, the disconnected peer uses the response times of the connection available responses and the stored response times of the peers still connected to the disconnected peers to select a peer to replace the lost connection. Different implementations can use different sets of connection rules. The disconnected peer stores the response time for the selected peer. In another implementation, the disconnected peer stores the response times for all the responses (positive and negative). In one implementation, the disconnected peer does not select a peer from which the disconnected peer has disconnected within a certain time period.

After selecting a peer for connection, the disconnected peer opens a connection to the selected peer, block 930. The disconnected peer sends a connection request to the selected peer and the selected peer confirms the request, opening the connection (unless the connection has become unavailable for the selected peer). The connections between peers can be direct or indirect (e.g., across a network, such as the Internet).

In one implementation, the connected peers send an update to the server confirming the connection.

Similar to the implementation described above for joining a grid referring to FIG. 8, in one implementation, if the disconnected peer still has an available connection after attempting to open a connection using a connection available message (e.g., because all the connection available responses were negative), the disconnected peer can send out a force connection message, as described above.

In another implementation, the disconnected peer uses the server to assist in opening a new connection. In one implementation, the server provides a list of grid members with available connections and those member peers' addresses. The disconnected peer sends the connection available messages directly to the indicated grid members.

The peer systems in the grid maintain the grid by periodically polling one another. In one implementation, connected peers send each other messages periodically to confirm the connection and the connected peer is still functioning.

Figure 10:
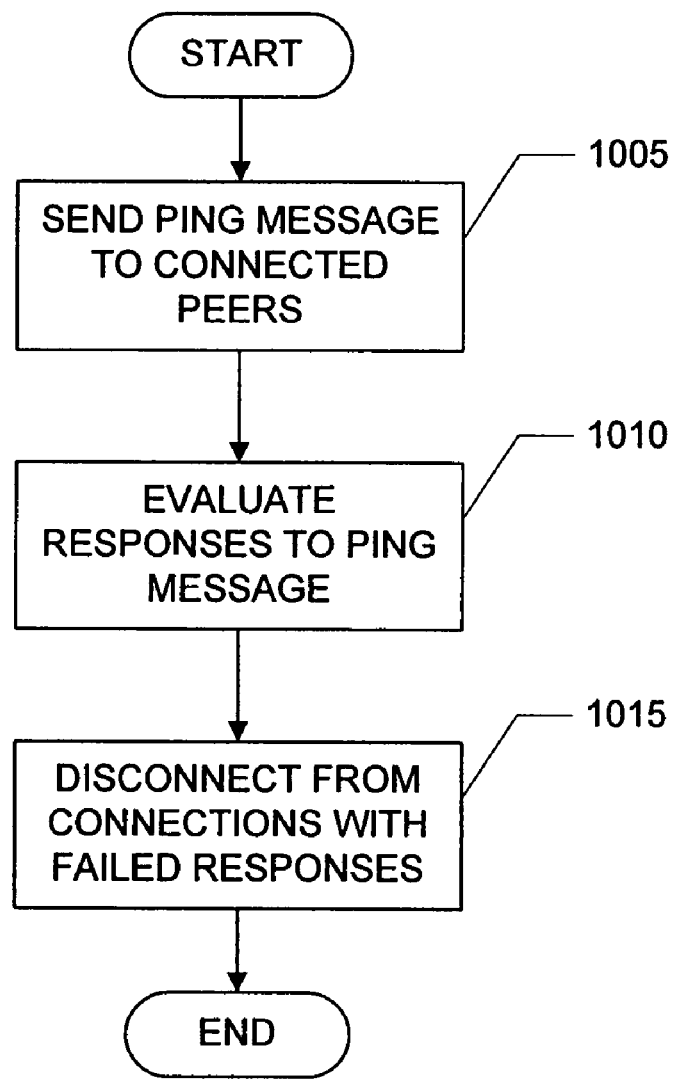
FIG. 10 shows a flowchart of one implementation of maintaining a peer-to-peer relay network.

FIG. 10 shows a flowchart 1000 of one implementation of maintaining a peer-to-peer relay network. Initially, multiple peer systems are connected in a grid.

A peer sends a maintenance message to each of the peers connected to that peer, block 1005. The maintenance message is a request for the recipient to provide a confirmation that the maintenance message was received. In one implementation, the peer sends a ping message (or pings) each connected peer. The peer evaluates the responses received to the maintenance messages, block 1010. The peer determines whether the responses are satisfactory or not. In one implementation, if a response is not received from a connected peer, the peer determines that the connection for the peer has failed (either because of the connection or because of the connected peer). If a response is not received before a time limit has expired, the peer determines that the connection for the peer has failed. The peer closes the connections for any connections the peer has determined have failed, block 1015. The peer sends a close connection request to the connected peer on a failed connection. When the peer receives confirmation, the peer closes the connection. If the peer cannot communicate with the connected peer on a failed connection or does not receive confirmation within a time limit, the peer closes the connection without confirmation. In another implementation, a peer waits to close a connection until the connection has been noted as failed for a period of time or number of failures. In one implementation, the peer sends an update to the server confirming any closed connections.

If the peer has closed any connections, the peer has voluntarily disconnected from one or more peers and sends out appropriate connection available messages (e.g., as described above referring to FIG. 9).

In another implementation, the peers use the server to evaluate failed connections. For example, when a peer determines that a connection has failed, the peer sends a request to the server for assistance. The server sends a message to the peer at the other end of the failed connection to confirm whether the peer has failed or the connection failed. The server then informs the peers to facilitate opening new connections or adjusting the network as appropriate.

FIGS. 11-18 illustrate an example of one implementation of building, adjusting, and maintaining a grid.

Figure 12:
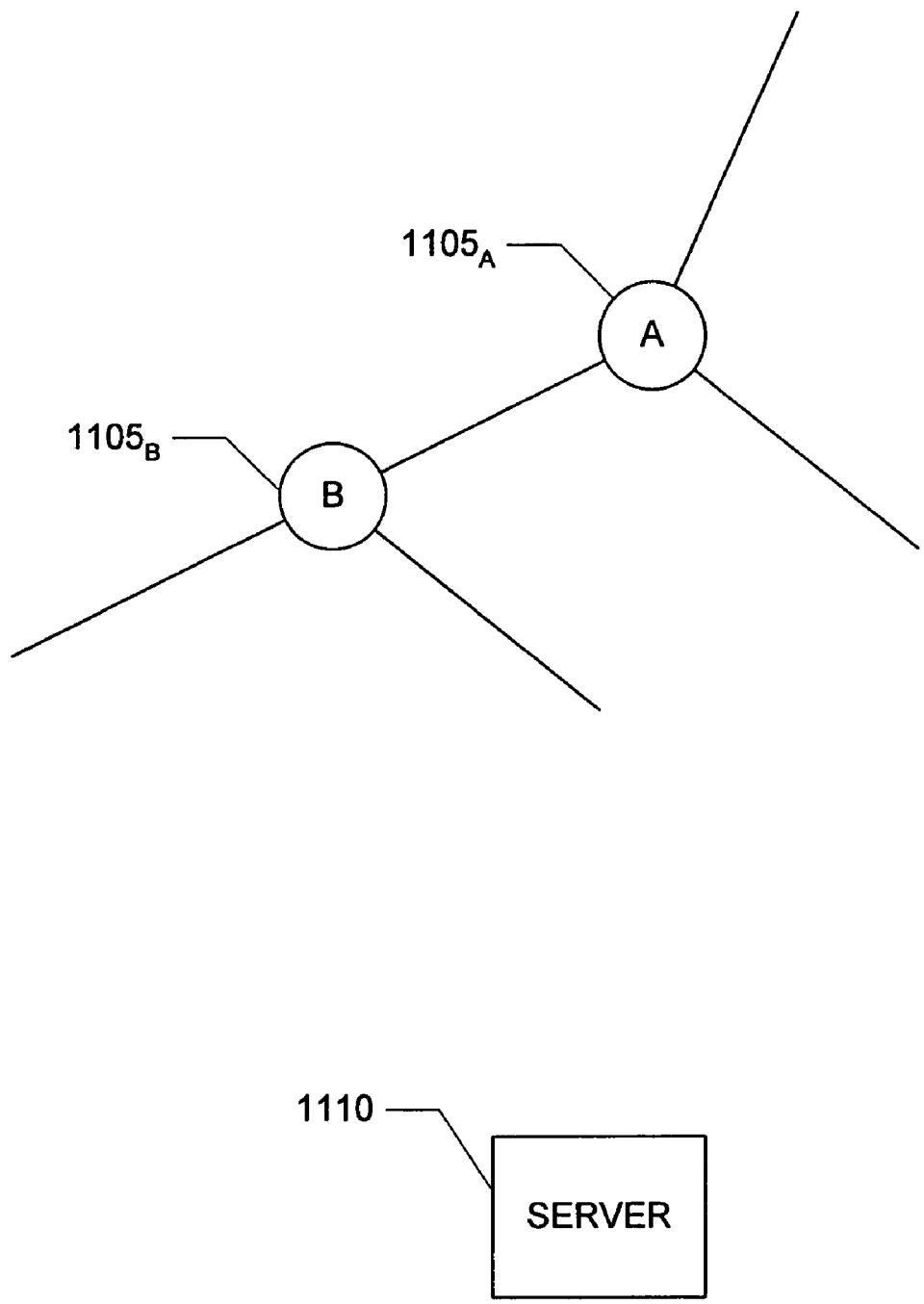

In FIG. 11, a peer system $1105_A$ (peer A) has established a peer-to-peer relay network (grid) 1100 using a server 1110 (the connection between peer A and the server 1110 is not shown). The connection limit for this grid is 3, so peer A has three available connections. In FIG. 12, a second peer system $1105_B$ (peer B) has joined the grid 1100. When peer B joins, peer B sends a join message to peer A and peer A sends a positive join response to peer B. Peer A and peer B open a connection.

Figure 13:
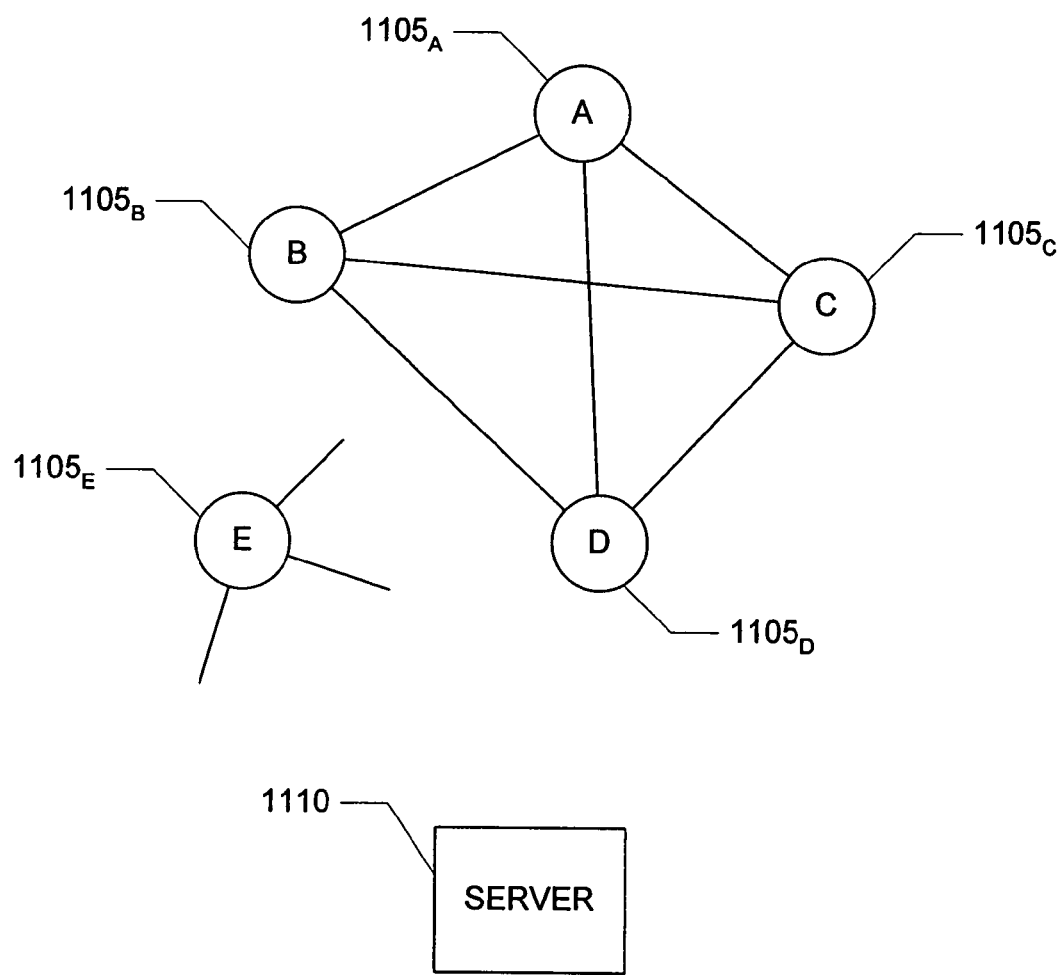
Figure 14:
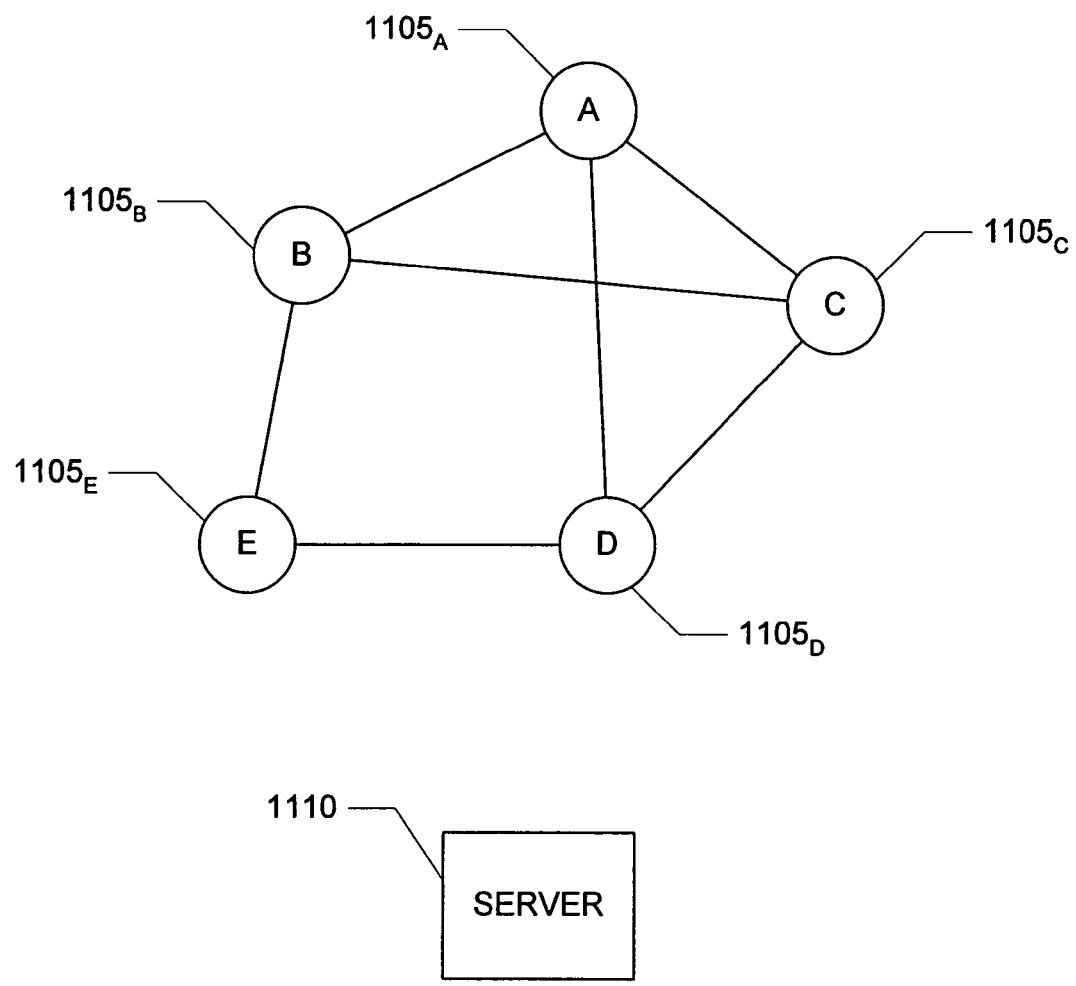

In FIG. 13, two more peer systems 1105$_C$ and 1105$_D$ (peer C and peer D) have already joined the grid 1100. Each of the four grid members peers A-D has established three connections with the other peers in the grid 1100. A new peer system 1105$_E$ (peer E) joins the grid. However, when peer E sends a join message to the other peers, all the join responses are negative because each of peers A-D already have the maximum number of connections permitted by the connection limit for the grid 1100. In FIG. 14, peer E has forced a connection to be opened. Peer E selects peer B from among the negative responses (e.g., because peer E received peer B's response first) and sends a force connection message to peer B. Peer B selects peer D to close a connection and closes the connection with peer D. Peer B confirms the connection with peer E and peers B and E open a new connection. When peer B closes the connection with peer D, peer D has an available connection. Peer D sends a connection available message to peers A and C and the peers relay the message throughout the grid 1100. Peers A, B, and C do not have available connections and so send negative responses to peer D. Peer E has two available connections and sends a positive response to peer D. Peer D opens a connection with peer E. Peer E still has an available connection and so sends out a connection available message. However, all the responses are negative. Peer E has two established connections and only has one available connection, so peer E does not force another connection to be opened.

Figure 15:
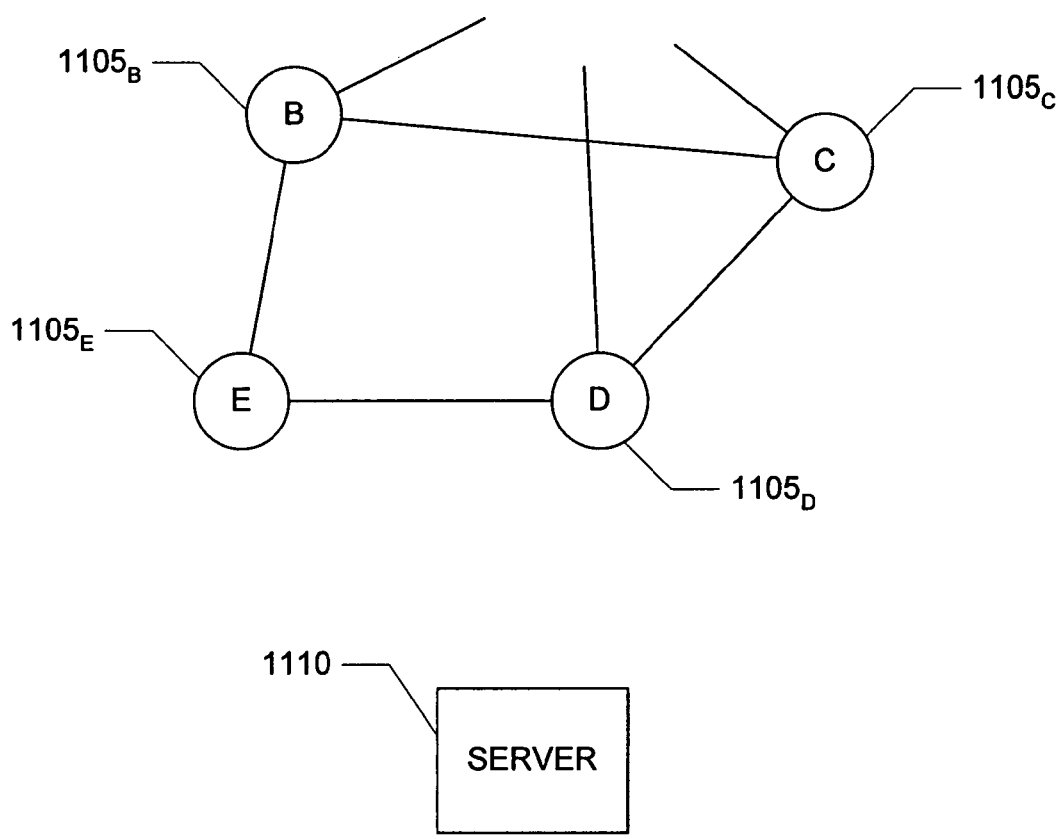
Figure 16:
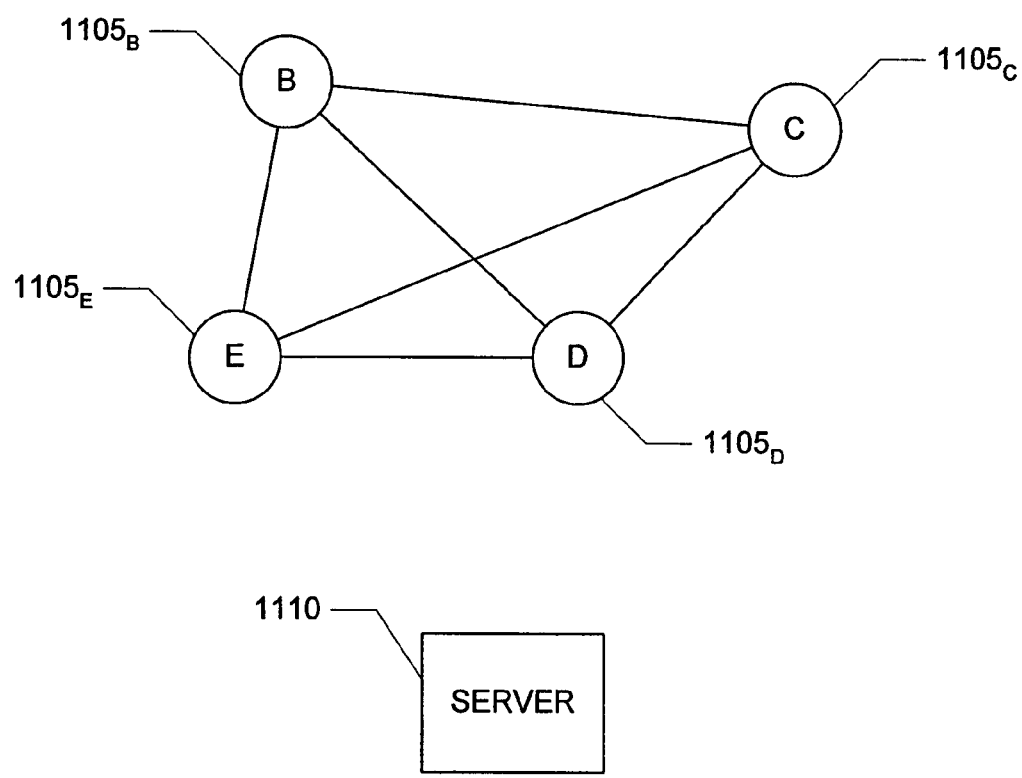

In FIG. 15, peer A disconnects from the grid 1100. Peer A was connected to each of peers B, C, and D. When peer A disconnects, peers B, C, and D each have an available connection. Peers B, C, and D send out connection available messages and peers B, C, D, and E each send positive responses. After evaluating the responses to the connection available responses and eliminating peers for already existing connections, the peers B-E establish connections as shown in FIG. 16. Each of peers B-E now has three connections.

Figure 17:
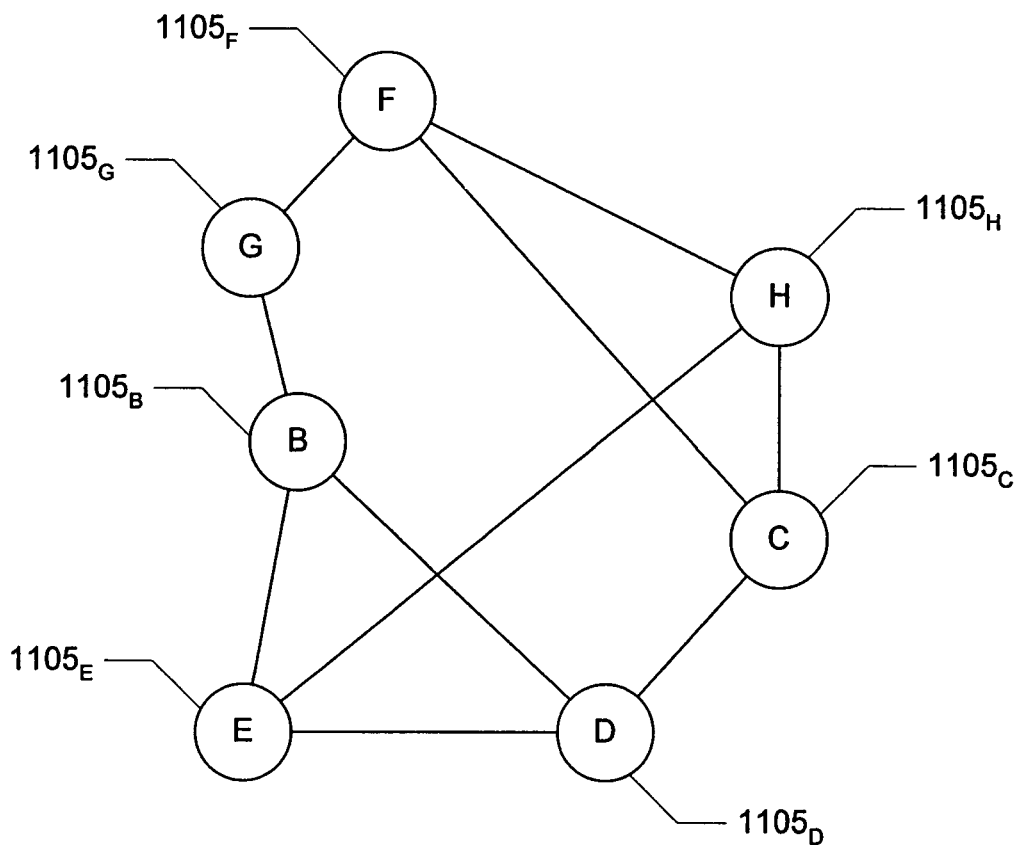

In FIG. 17, three new peer systems 1105$_F$, 1105$_G$, and 1105$_H$ (peers F, G, and H) have joined the grid 1100 and established connections. As part of the regular activity to maintain the grid, the peers B-H each send ping messages to their connected peers. For example, peer B pings peers D, E, and G on a regular basis. Peer D does not provide a satisfactory response to peer B for peer B's ping message (e.g., the response from peer D is too slow or does not arrive at peer B). In FIG. 18, peer B has closed the connection peer D. When peer B closes the connection, peer B and peer D have available connections. Peers B and D send out connection available messages to be relayed through the grid 1100. Peer B receives positive responses from peers G and D. Peer B is already connected to peer G so will not select peer G for a new connection. Peer B just disconnected from peer D for a failed connection and so will not select peer D for a new connection. Peer B does not open a new connection (peer B has two open connections and only available connection, so peer B does not attempt to force a connection, though in another implementation peer B may). Peer D receives positive responses from peers B and G. Peer B just disconnected from peer D for a failed connection so peer D will not select peer B for a new connection (or peer B would refuse a new connection request). Peer D selects peer G and opens a connection to peer G.

In the examples illustrated in FIGS. 11-18, the peers of the grid 1100 open and close connections to build and adjust the grid without relying on the server 1110 to manage the connections (though the server 1110 does assist in providing a new peer with the addresses of the current member peers of a grid).

Redundancy Lists

In one implementation, the peers in a grid reduce redundant message traffic by avoiding sending messages determined to be redundant based on current paths in the grid.

In this implementation, each peer in the peer-to-peer relay network stores a redundancy list. The redundancy list of a peer indicates other peers to which the peer will not send messages that originated from a designated peer. Accordingly, each entry in the redundancy list indicates an origin peer and a destination peer (connected to the relaying peer). When a peer receives a message that indicates an originating peer that is in the peer's redundancy list, the peer will not relay that message to the connected peer indicated by the corresponding entry in the redundancy list. In another implementation, the peers can turn on and turn off the redundancy list functionality (e.g., at the request of a server, such as after determining a security problem has arisen).

Figure 19:
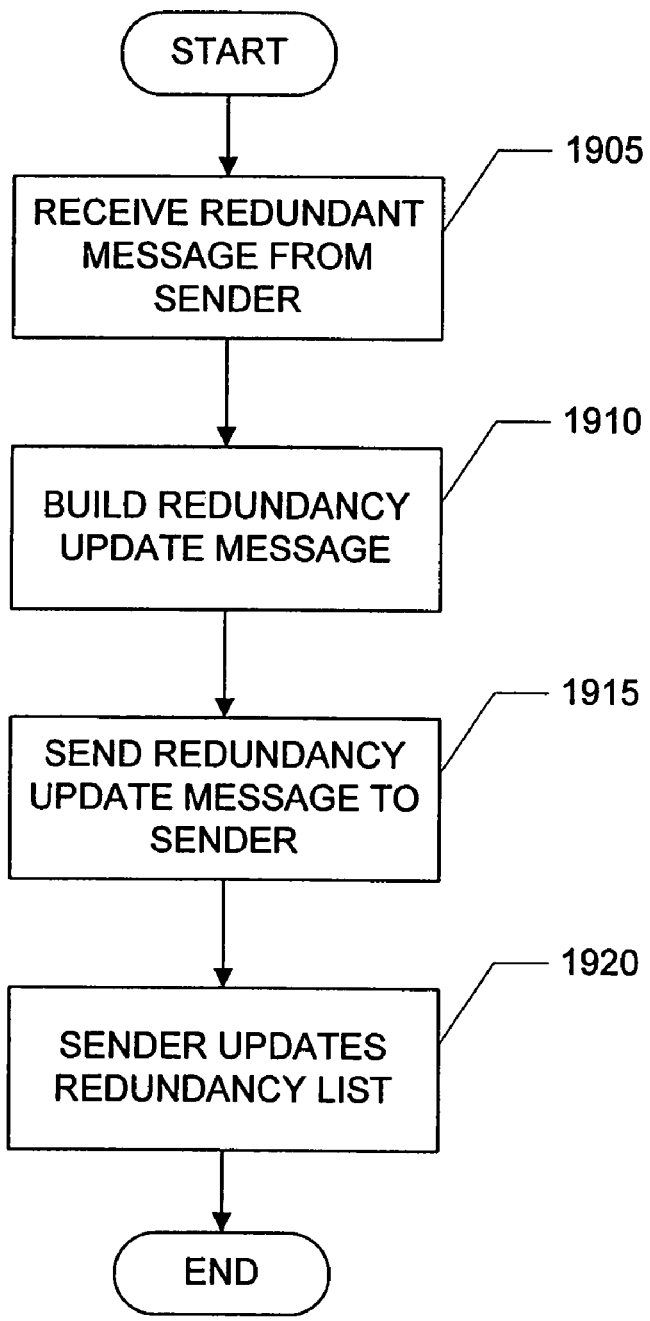
FIG. 19 shows a flowchart of one implementation of building a redundancy list in a peer-to-peer relay network.

FIG. 19 shows a flowchart 1900 of one implementation of building a redundancy list in a peer-to-peer relay network. Initially, multiple peer systems are connected to form a peer-to-peer relay network. A recipient peer is connected to at least two other peers.

The recipient peer receives a redundant message from connected peer, block 1905. The redundant message is redundant because the recipient peer has already received the same message. The recipient peer identifies the redundant message as being the same using information in the received message. As described above, in some implementations, each peer maintains a list of messages received to avoid relaying the same message twice. The recipient peer can also use this list to recognize a redundant message.

The recipient peer builds a redundancy update message, block 1910. The recipient peer includes in the redundancy update message the information identifying the origin of the message and information identifying the recipient peer. For example, the recipient peer retrieves the origin identifier from the redundant message (e.g., recall the message shown in FIG. 2) and stores the origin identifier in the redundancy update message.

The recipient peer sends the redundancy update message to the sender of the redundant message, block 1915. The redundant message includes in its address information address information for the sender of the redundant message.

The sender of the redundant message receives the redundancy update message and updates the redundancy list for the sender, block 1920. The sender retrieves the information from the redundancy update message identifying the origin of the redundant message and the recipient of the redundant message (the recipient peer). The sender adds an entry to the sender's redundancy list indicating that the sender should not send a message originating from the indicated origin to the recipient peer.

For example, referring to the grid 100 shown in FIG. 1, peer B receives messages originating from peer C from each of peers A, D, and E. Assuming peer B receives the message originating from peer C from peer A first, the messages originating from peer C received from peers D and E are redundant messages. Peer B builds redundancy update messages to send to peers D and E indicating peer C as the origin and peer B as the recipient. Peer B sends the redundancy update message to peer D. Peer D updates its redundancy list to indicate that peer D is not to relay messages originating from peer C to peer B.

Peer E receives a similar redundancy update message from peer B and also updates its redundancy list in a similar way.

As peers connect and disconnect to and from the grid, the paths between clients change and so redundancy lists can become inaccurate. Accordingly, when a peer disconnects from the grid, the remaining peers update redundancy lists.

Figure 20:
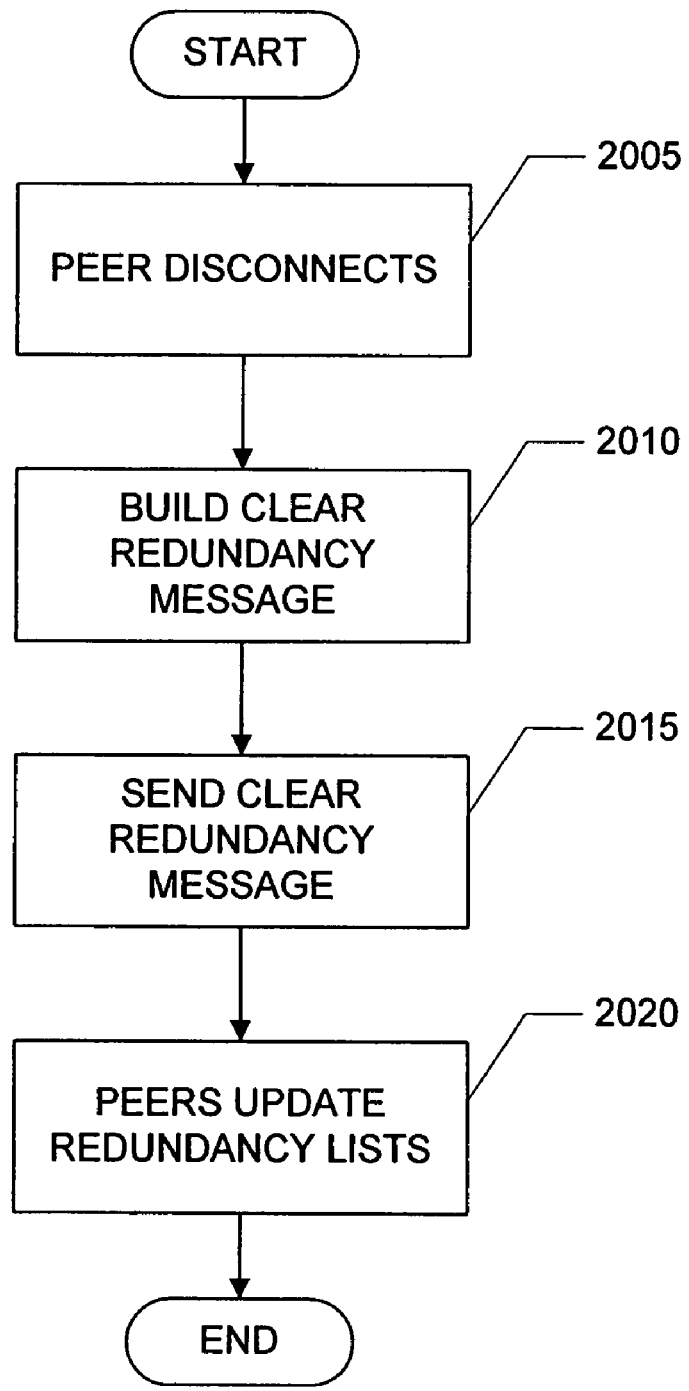
FIG. 20 shows a flow chart of one implementation of updating redundancy lists for a disconnecting peer in a peer-to-peer relay network.

FIG. 20 shows a flow chart 2000 of one implementation of updating redundancy lists for a disconnecting peer in a peer-to-peer relay network. Initially, multiple peers systems are connected to form a peer-to-peer relay network. A disconnecting peer is connected to at least two other peers.

The disconnecting peer disconnects from the grid, block 2005. The peers previously connected to the disconnecting peers are now disconnected peers. Each of the disconnected peers follows the same process below.

The disconnected peer builds a clear redundancy message, block 2010. The clear redundancy message indicates information identifying the disconnected peer. The disconnected peer sends the clear redundancy message to the peers still connected to the disconnected peer, block 2015. A peer that receives the clear redundancy message from the disconnected peer updates its redundancy list, block 2020. The peer receiving the clear redundancy message removes entries in the peer's redundancy list affecting relaying messages to the disconnected peer indicated by the clear redundancy message.

Returning to the example described above referring to FIGS. 1 and 19, peer D has an entry in its redundancy list indicating that peer D should not relay messages originating from peer C to peer B. If peer A disconnects from the grid, peer B recognizes the disconnection of peer A and builds a clear redundancy message. Peer B sends a clear redundancy message to peers D and E. Peer D receives the clear redundancy message from peer B and clears the entry in peer D's redundancy list indicating that peer D should not relay messages originating from peer C to peer B. Accordingly, the next time that peer D receives a message originating from peer C, peer D will once again relay message to peer B. Peer E updates its redundancy list similarly.

Multiple Grids

In one implementation, a peer system can belong to multiple peer-to-peer relay networks. Each grid can be related or independent. The connections established according to each grid can be independent. Accordingly, a peer can be connected to one peer in one grid but not in another (even though the two peers are both in both grids). In one implementation, if two peers are connected in two grids, the peers use a single connection. A message includes information indicating to which grid the message belongs. A peer relays a received message according to the connections established corresponding to the indicated grid for the message.

In one implementation, the members of a peer-to-peer relay network can create sub-networks within the peer-to-peer relay network. In this case, each of the members of a sub-network is also a member of the larger grid. For example, a peer-to-peer relay network includes all the players in a game as peer systems and each team (including sub-sets of the total players) has a sub-network of peer systems (e.g., for private communication in the game). In this way, the peers can establish a multi-channel environment for desirably distributing and receiving data.

In another implementation, the peer-to-peer relay networks are independent but share one or more member peer systems. For example, a group of peers can establish a grid to support a lobby or chat environment and another group of peers including at least one peer of the first group can establish a grid to support a particular game. In another example, a group of peers form a grid for a clan (organization) and some of those peers join or create other grids to play games.

For example, in an online environment, all the peers in the environment are connected to a single main grid. The main grid is for general announcements and general services. Peers create, join, and leave additional smaller grids to access online services such as chat rooms or games. Peers can use the main grid to communicate before a smaller grid has been established, such as when a new peer wants to join a grid (rather than using a server). Because all the control messages can be broadcast through the main grid, every peer can independently maintain a list of available grids and a list of active peers in each grid. In one implementation, the peers do not use a centralized server.

Figure 21:
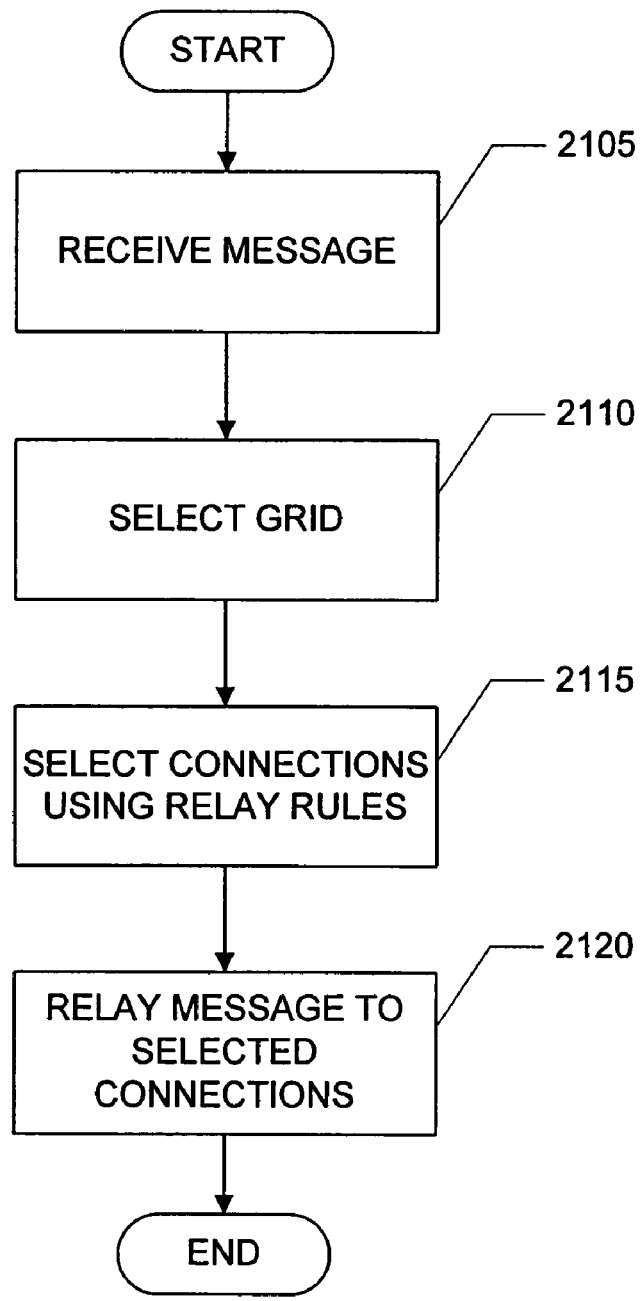
FIG. 21 shows a flow chart of one implementation of relaying a message from a peer system that belongs to multiple grids.

FIG. 21 shows a flow chart 2100 of one implementation of relaying a message from a peer system that belongs to multiple grids. Initially, multiple peers systems are connected to form two peer-to-peer relay networks. A relaying peer is a member of both grids, and has respective connections and relay rules for each grid.

The relaying peer receives a message, block 2105. The message includes a grid identifier indicating to which grid the message belongs.

The relaying peer selects the grid indicated by the received message, block 2110. Each grid has a respective set of connections and a respective set of relay rules. By selecting a grid, the relaying peer selects a set of connections to use and a set of relay rules to use for relaying the received message.

The relaying peer selects connections according to the selected grid and the corresponding relay rules, block 2115. Using the relay rules for the selected grid, the relaying peer select any appropriate connections for relaying the received message.

The relaying peer sends the received message to the selected peers, block 2120. Before relaying the message, the relaying peer adjusts the received message for each selected peer, such as by updating the address information for the received message to indicate the received message is being relayed from the relaying peer to the selected peer.

Spectators

In one implementation, the peers in a grid are classified as participants or spectators. A participant peer generates new messages to be relayed throughout the grid. A spectator peer does not generate new messages and acts as a pass-through node in the grid. Both participants and spectators relay messages to their connected peers according to the relay rules of the grid. In some applications, there may be many spectators for each participant. In one implementation having multiple participants, each participant has a connection to at least one other participant.

In one example, a group of participants play an online game while spectators watch (observing data without changing the game data). The number of spectators can be very large (e.g., thousands). Other examples include performances (e.g., music), speeches, and teaching. In some applications, because the peers handle distribution by relaying data, the load on a server for distribution does not always increase as the number of spectators increases.

In one implementation, when a peer joins a grid, the peer joins the grid as a participant or as a spectator. If the peer joins the grid as spectator, the peer is not authorized to create new messages and send the new messages into the grid to be relayed throughout the grid. If a spectator generates a new message and sends the new message to the peers connected to the spectator, the peers receiving the new message from the spectator will not forward or relay the received message. In one implementation, some or all of the spectators could form another related grid as participants (e.g., to discuss a game being watched in the first grid).

Figure 22:
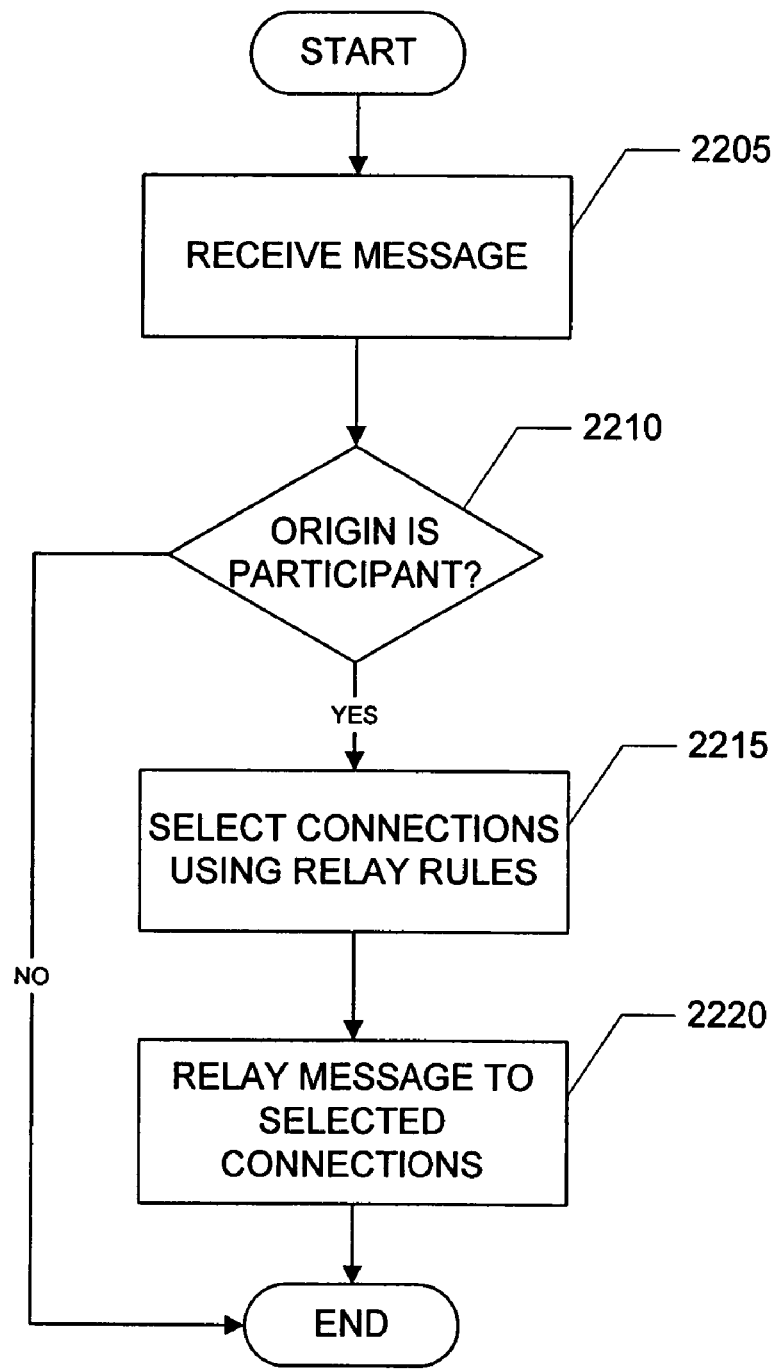
FIG. 22 shows a flow chart of one implementation of relaying a message in a grid supporting spectators and participants.

FIG. 22 shows a flow chart 2200 of one implementation of relaying a message in a grid supporting spectators and participants. Initially, multiple peers systems are connected to form a peer-to-peer relay network supporting participants and spectators. Each of the peers systems stores a list of the peers that are participants. In one implementation, the participant peers periodically broadcast messages indicating which peers are participants. In another implementation, the server facilitates identifying the participants.

A relaying peer receives a message, block 2205. The message includes an origin identifier indicating the peer that created the message.

The relaying peer confirms that the origin of the received message is a participant peer, block 2210. The relaying peer stores a list of participant peers. The relaying peer compares the peer identified as the origin of the received message with the list of participant peers. If the origin peer for the received message is not a participant (i.e., is a spectator), the relaying peer does not relay the received message.

If the origin peer for the received message is a participant, the relaying peer selects connections according to the relay rules for the grid, block 2215. Using the relay rules, the relaying peer selects any appropriate connections for relaying the received message.

The relaying peer sends the received message to the selected peers, block 2220. Before relaying the message, the relaying peer adjusts the received message for each selected peer, such as by updating the address information for the received message to indicate the received message is being relayed from the relaying peer to the selected peer.

In another implementation, the spectators are not in the same grid as the participants. The spectators form a parallel spectator grid linked to the participant grid. The spectators receive data from the participants and relay the data in the spectator grid. The link(s) between the grids can be provided by a server or gateway, or by connections between selected peers from each grid.

In another implementation, a spectator can be a conditional spectator. A conditional spectator can request permission to generate data to be relayed throughout the grid. If the spectator has received permission, the spectator can send a message that the peers in the grid will relay (e.g., the message includes an authorization flag). The permission can be granted by a server, by a selected peer as a moderator, or by the participants (one or more). For example, in a teaching environment, the participant is the lecturer and the spectators can request permission to ask questions that will be relayed to all the peers.

Island Recovery

In one implementation, the server and peers in a peer-to-peer relay network support adjusting connections in the grid to avoid or recover from the formation of islands. An isolated group of peers in a grid is referred to as an island. Islands can form in a grid when multiple peers disconnect substantially simultaneously. In the disconnection process described above, the remaining peers send messages indicating available connections, however, with multiple concurrent disconnections, the remaining peers may form isolated groups in the grid. Peers in one island cannot send messages to peers in another island because there is no peer-to-peer connection between the islands. The server detects the formation of islands and interacts with peers to remove the islands.

Figure 23:
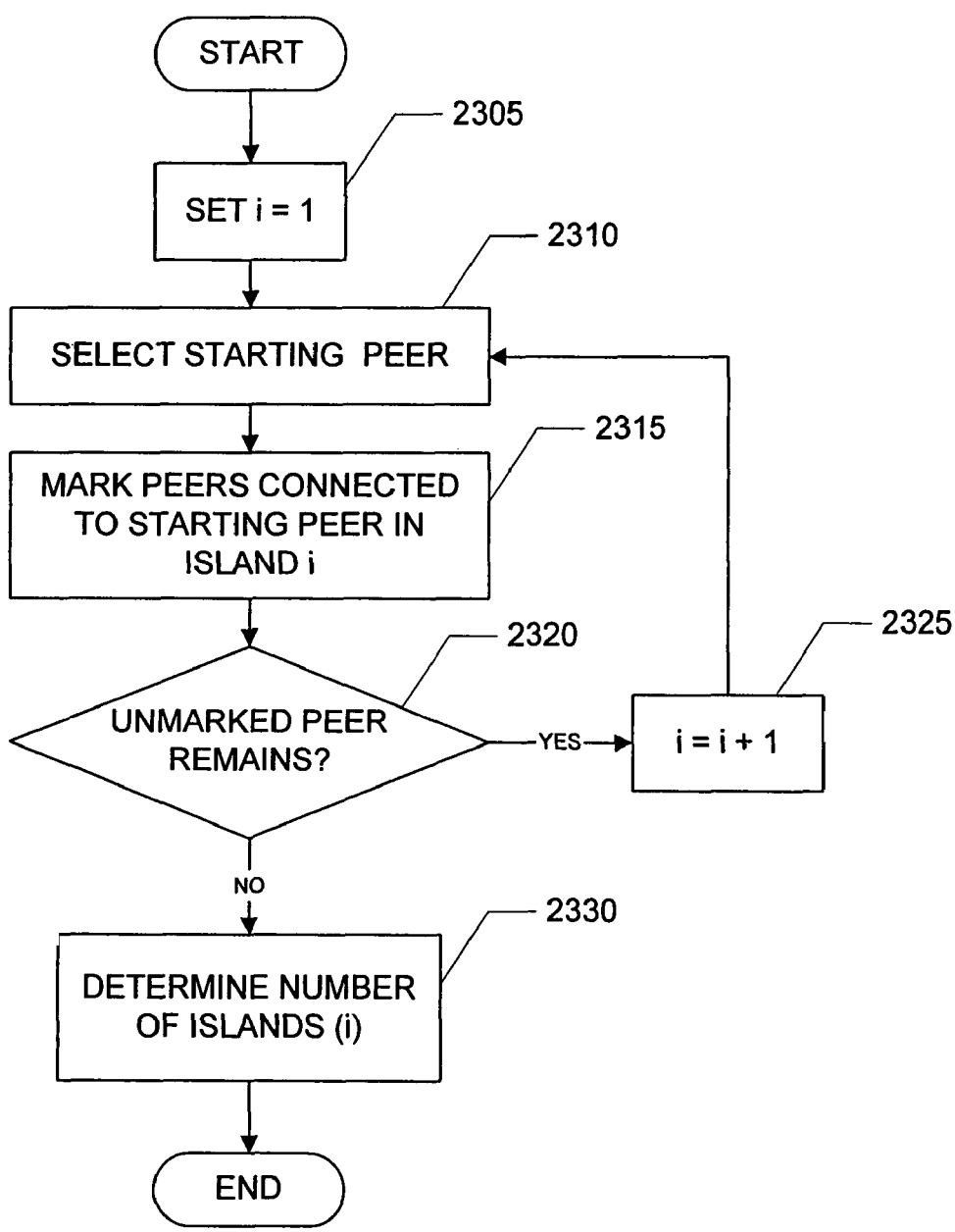
FIG. 23 shows a flow chart of one implementation of detecting islands in a grid.

FIG. 23 shows a flow chart 2300 of one implementation of detecting islands in a grid. Initially, multiple peer systems are connected to form a peer-to-peer relay network or grid. When the peers open and close connections, or become disconnected, peers inform the server for the grid of the changing connections. In this way, the server tracks all of the connections in the grid. The server also maintains an ordered list of the peers in the grid.

The server sets an island counter, block 2305. The island counter represents the number of islands. In one implementation, the server sets a counter i to be 1.

The server selects a starting peer, block 2310. When the island counter is one, the server selects the first peer in the ordered list of peers as the starting peer. When the island counter is greater than one, the server selects as the starting peer the most recently found unmarked peer (as described below).

The server marks each peer connected to the starting peer as belonging to the same island as the starting peer, block 2315. The server marks peers connected directly to the starting peer and connected indirectly to the starting peers through other peers (e.g., progresses from the starting peer to connected peers and peers connected to those connected peers and so on). The server marks a peer with the current value of the island counter to indicate to which island the peer belongs.

After marking all of the peers connected to the starting peer, the server determines if there is an unmarked peer remaining in the grid, block 2320. In one implementation, the server progresses through the ordered list of peers searching for an unmarked peer.

If the server finds an unmarked peer, the server increments the island counter, block 2325. The server increments the island counter to indicate that an additional island has been detected. After incrementing the island counter, the server returns to block 2310 and uses the found unmarked peer as the starting peer.

If the server does not find an unmarked peer, the server determines the number of islands detected, block 2330. The server has incremented the island counter for each detected island, and so the island counter represents the number of islands detected. If the island counter is equal to one, a single island has been found and so the grid is not divided into multiple islands. If the island counter is greater than one, multiple islands have been found and the grid is divided into islands.

Figure 24:
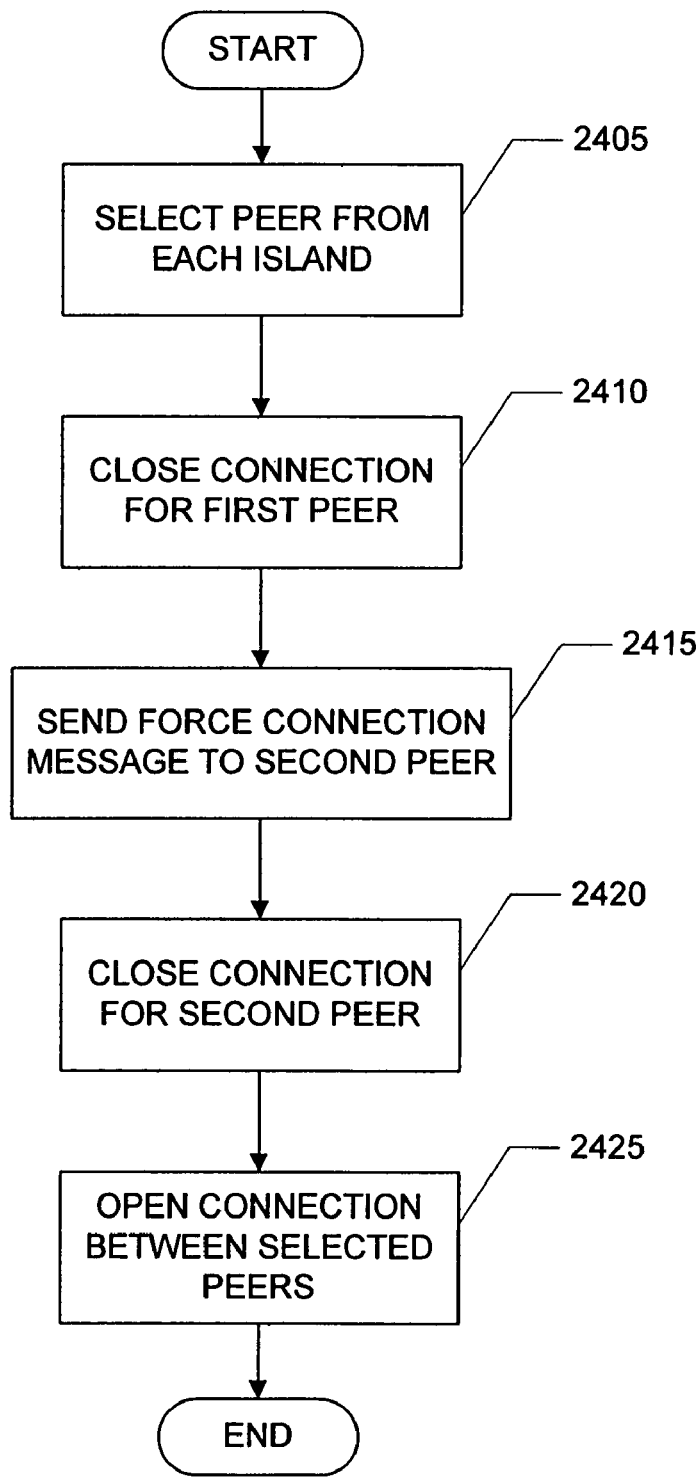
FIG. 24 shows a flow chart of one implementation of removing islands in a peer-to-peer relay network.

FIG. 24 shows a flow chart 2400 of one implementation of removing islands in a peer-to-peer relay network. Initially, multiple peers systems are connected in a peer-to-peer relay network or grid. The grid has become divided into two islands of peers, where the peers in one island do not have a connection path to the peers in the other island. The server has detected the two islands, such as by using the process shown in FIG. 23.

The server selects a peer from each island, block 2405. The server can select the first island peer and the second island peer in various ways. In one implementation, the server selects a peer that has an available connection. In another implementation, the server selects a peer from an island at random.

If the first island peer does not have available connections, the server sends a close connection message to the first island peer to close a connection, block 2410. The first island peer receives the message from the server and selects a connection to close in the same way as a peer selects a connection to close when receiving a force connection message, as described above. The first island peer closes a connection and so has an available connection.

The server sends an initiate force connection message to the first island peer, block 2415. The initiate force connection message includes the address of the second island peer. The first island peer receives the message from the server and sends a force connection message to the second island peer.

The second island peer receives the force connection message from the first island peer, selects a connection to close, and closes the selected connection, block 2420. The second island peer selects the connection to close in the same way as described above for the recipient of a force connection message. If the second island peer has an available connection before closing a connection, the second island peer does not close any of its connections.

The first island peer sends an open connection request to the second island peer, and the two peers open a connection, block 2425. Once the connection is open, the islands have been joined, forming a single island. The peers send updates to the server confirming the connection. If additional islands remain, as detected as described above, the server returns to block 2405 to connect two more of the remaining islands.

Figure 25:
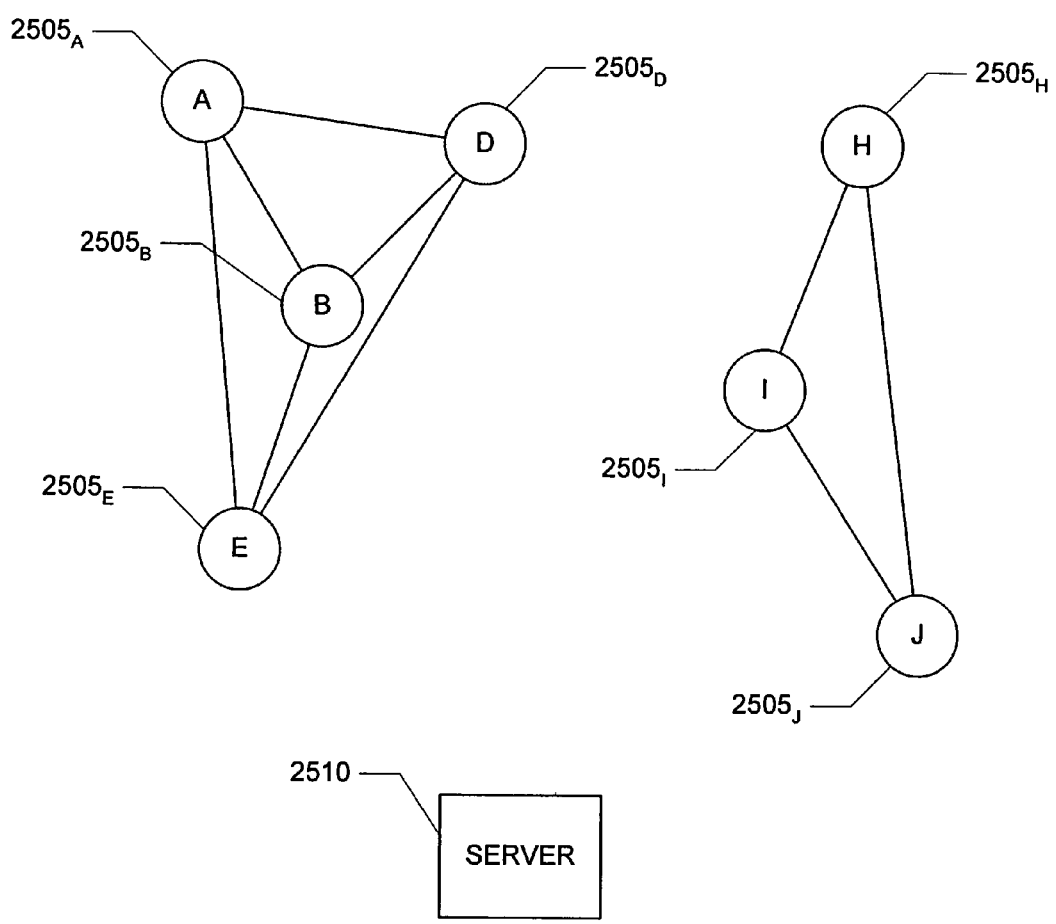
FIGS. 25 and 26 illustrate an example of detecting islands and joining islands.
Figure 26:
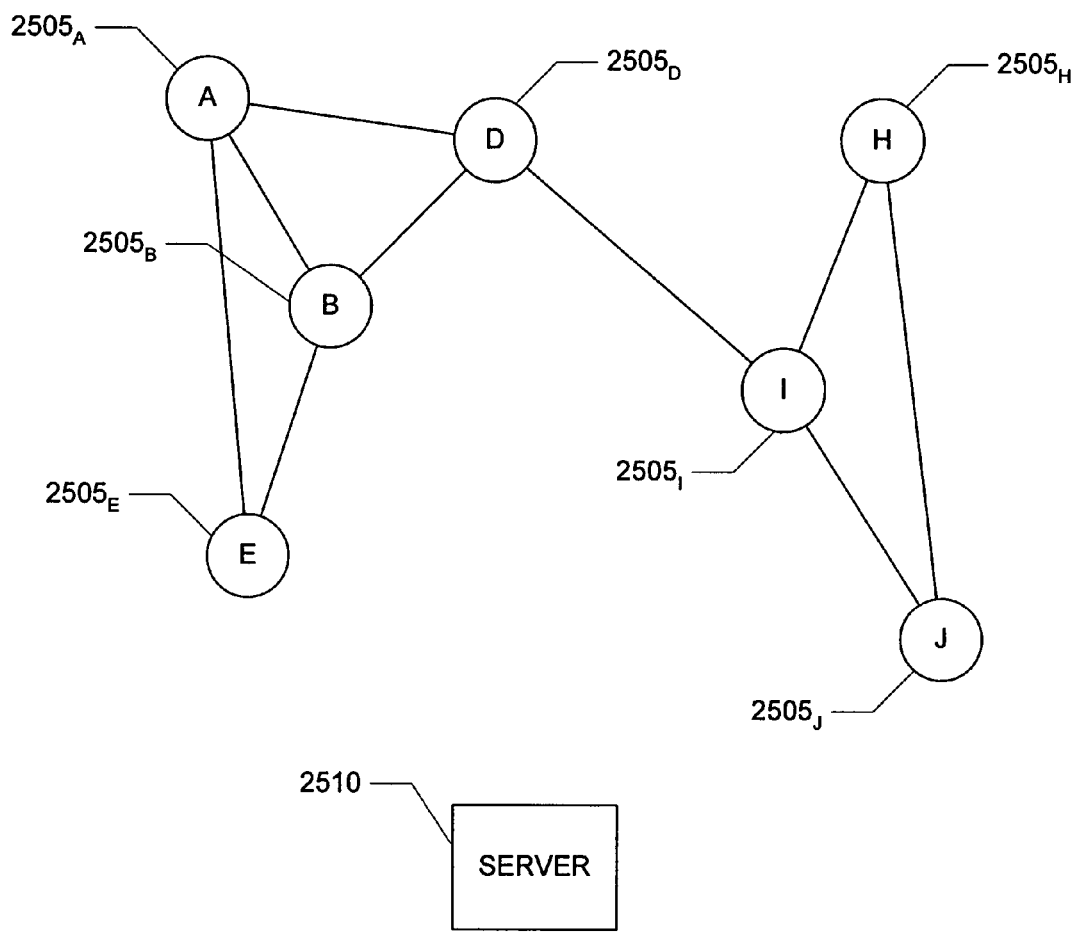

FIGS. 25 and 26 illustrate an example of detecting islands and joining islands. In FIG. 25, a grid 2500 similar to the grid 1100 in FIG. 11 has been divided into two islands from the simultaneous disconnection of peers C, G, and F. The first island includes peers A, B, D, and E. The second island includes peers H, I, and J. In FIG. 26, the server has caused peer D to open a connection with peer I, joining the two islands.

Security

In one implementation, the peer-to-peer relay network supports the detection of and recovery from cheating violations or security violations, or both. Cheating violations involve the manipulation of data to change an outcome in the processing of online activity, such as to affect the course of a game. Security violations involve unauthorized data or improper use of data to damage the grid or cause the grid to fail.

Figure 27:
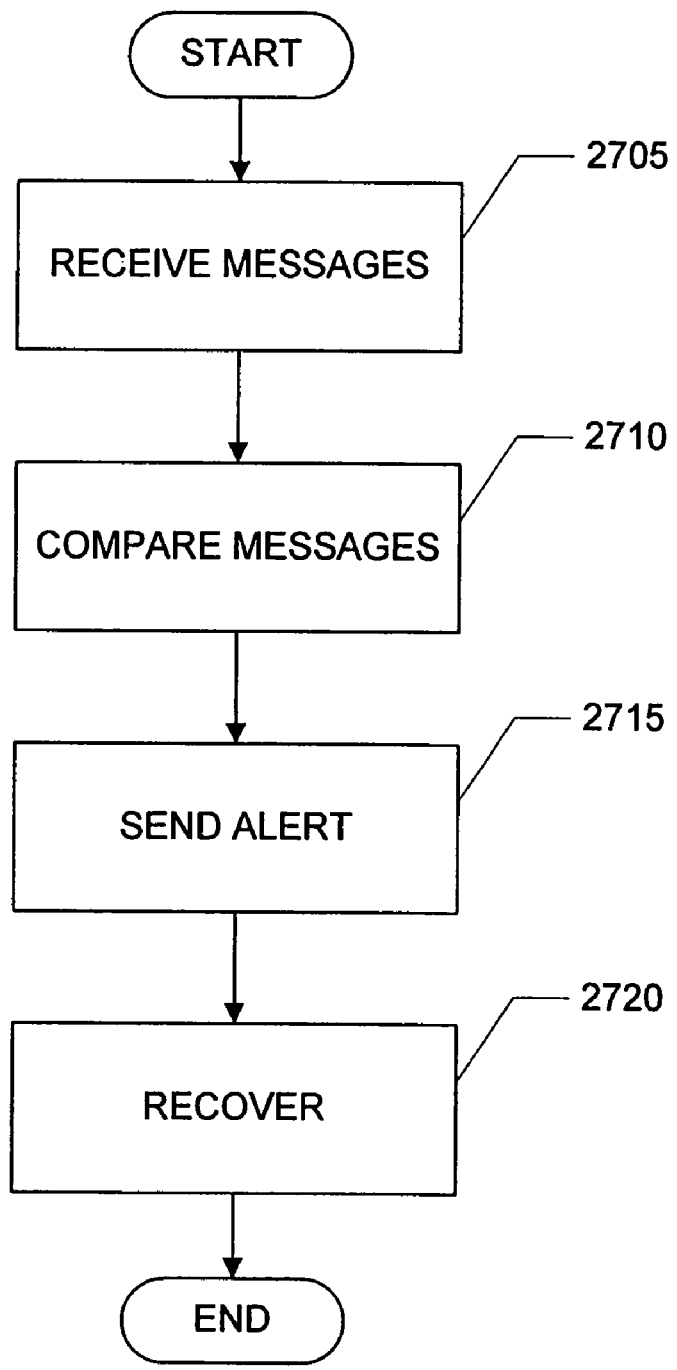
FIG. 27 shows a flow chart of one implementation of detecting a cheating violation in a peer-to-peer relay network.

FIG. 27 shows a flow chart 2700 of one implementation of detecting a cheating violation in a peer-to-peer relay network. Initially, multiple peer systems are connected to form a peer-to-peer relay network or grid.

The peer receives a message from each of its connected peers, block 2705. As described above, the peers in the grid relay messages throughout the grid. A peer will receive the same message (the same content data, though the address information may be different) through each of its connections with other peers. For example, if a peer has three open connections, the peer receives the same message three times from three respective peers. The peer identifies the messages as being the same message using information in the message indicating the origin and a sequence value, such as the origin identifier 215 and sequence value 220 shown in the message 205 in FIG. 2. The same message from different peers will have the same origin and sequence information.

The peer compares the messages received from each of the connected peers, block 2710. The peer compares the data portion of the message, such as the data 230 shown in the message 205 in FIG. 2. The peer determines if the data portion of the message is different for any of the received messages. In one implementation, if the data portion for a message received from one connected peer is different from the data portion for the same message received from the other connected peers, the peer determines that a cheating violation has occurred. The peer also determines that the one peer that sent the message with the different data is responsible for the cheating violation. Alternatively, the peer uses a different technique to detect a cheating violation or identify the peer responsible for the cheating violation. The peer does not relay the message having a different data portion, if appropriate.

If a cheating violation has occurred, the peer sends a cheating alert, block 2715. The cheating alert indicates a cheating violation has occurred and which peer is responsible for the cheating violation. The peer sends the cheating alert to the connected peers to relay the alert throughout the grid. In another implementation, the peers send the cheating alert to the server for appropriate handling.

When the peers receive the cheating alert, the peers take action to recover against the violation, block 2720. The peers take action to prevent the cheating peer from continuing to influence the grid activity. In one implementation, the peers ignore messages from the cheating peer. In another implementation, the peers force the cheating peer to disconnect from the grid. The peers also take action to repair the effect of the message including the different data, such as by sending out a replacement message with correct data as shown by the data in the other messages used to identify the cheating message. Alternatively, one of the peers estimates the correct data and relays the correct data throughout the grid. In another implementation, the peers respond to the cheating alert by informing the server. In this case, the server addresses the cheating violations such as by disconnecting the peer responsible for the cheating violation.

In another implementation, when a peer sends a message, the recipient relays the message back to the sending peer. The sending peer keeps a copy of the sent message. When the sending peer receives the message back from the recipient, the sending peer compares the data of the sent message with the data of the received message. The peer detects a cheating violation by finding a difference. The peer determines that the recipient modified the message and sends out a cheating alert. In one implementation, recovery or repair actions are not taken for a cheating peer until multiple violations have been reported (e.g., as tracked by a server). In another implementation, this send-back check for cheating is a first layer for detecting cheating followed by more complicated procedures once a potential problem has been identified.

In another implementation, the peer detects a cheating violation by comparing the data in a received message with a predicted set of data generated by the peer. If the peer determines that the data in the received message is different from that generated by the peer, the peer determines that the sender of the received message is responsible for a cheating violation and issues an alert.

In an example of detecting a cheating violation in the grid 100 shown in FIG. 1, peer B receives the same message from each of peers A, D, and E. Peer B identifies the messages as being the same by comparing the origin identifiers and sequence values. If peer B detects that the message from peer A has a different data portion, peer B issues a cheating alert identifying peer A as cheating. Peer B sends the cheating alert to peers D and E (and optionally to peer A). The peers relay the cheating alert until all the peers have received the alert. In response to the alert, the peers will ignore all further messages from peer A. As a result, peers B, C, and D will not relay messages from peer A anymore.

Figure 28:
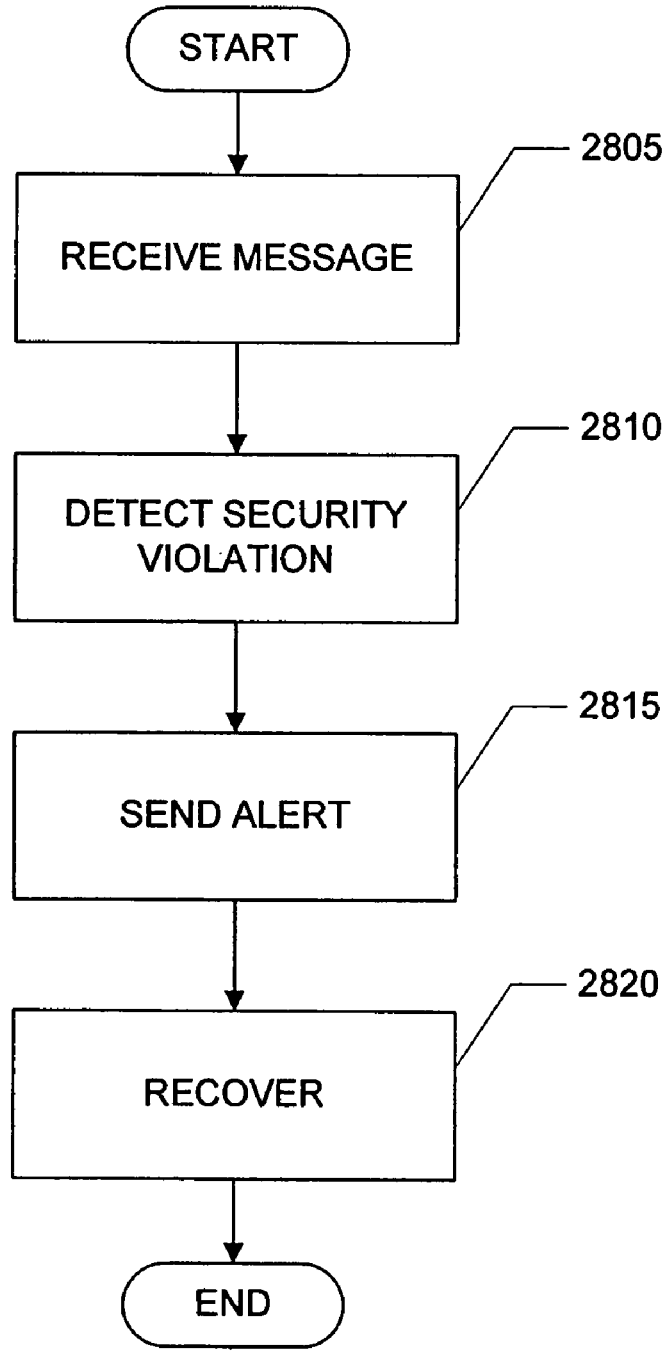
FIG. 28 shows a flow chart of one implementation of detecting a security violation in a peer-to-peer relay network.

FIG. 28 shows a flow chart 2800 of one implementation of detecting a security violation in a peer-to-peer relay network. Initially, multiple peer systems are connected to form a peer-to-peer relay network or grid.

The peer receives a message from one of its connected peers, block 2805. The peer analyzes the message and detects a security violation, block 2810. The peer determines that the message is a security violation by recognizing that the message is invalid or includes invalid data. In another implementation, the peer determines that the message is a security violation by analyzing how the message was sent to the peer. For example, if the message was sent to the peer as one of a large number of repetitions of the same message (e.g. as in a denial of service attack), the peer recognizes that the message is a security violation. In one implementation, a message is sent as a series of packets and the peer detects a security violation at a lower level than a complete message, such as at the packet level. The peer also determines that the sender of the message with the security violation is responsible for the security violation. Alternatively, the peer uses a different technique to detect a security violation or identify the peer responsible for the cheating violation. The peer does not relay a message or data having a security violation.

If a security violation has occurred, the peer sends a security alert, block 2815. The security alert indicates a security violation has occurred and which peer is responsible for the security violation. The peer sends the security alert to the connected peers to relay the alert throughout the grid. In another implementation, the peer sends the security alert to the server for proper handling.

When the peers receive the security alert, the peers take appropriate action to recover against the violation, block 2820. The peers take action to prevent the peer violating the security of the grid from continuing to affect or damage the grid. In one implementation, the peers ignore messages from the peer responsible for the security violation. In another implementation, the peers force the peer responsible for the security violation to disconnect from the grid. The peers also take appropriate action to repair any damage caused by the security violation. In another implementation, the peers respond to the security alert by informing the server. In this case, the server addresses the security violation such as by disconnecting the peer responsible for the violation and the action to repair any damage caused to the grid.

Figure 29:
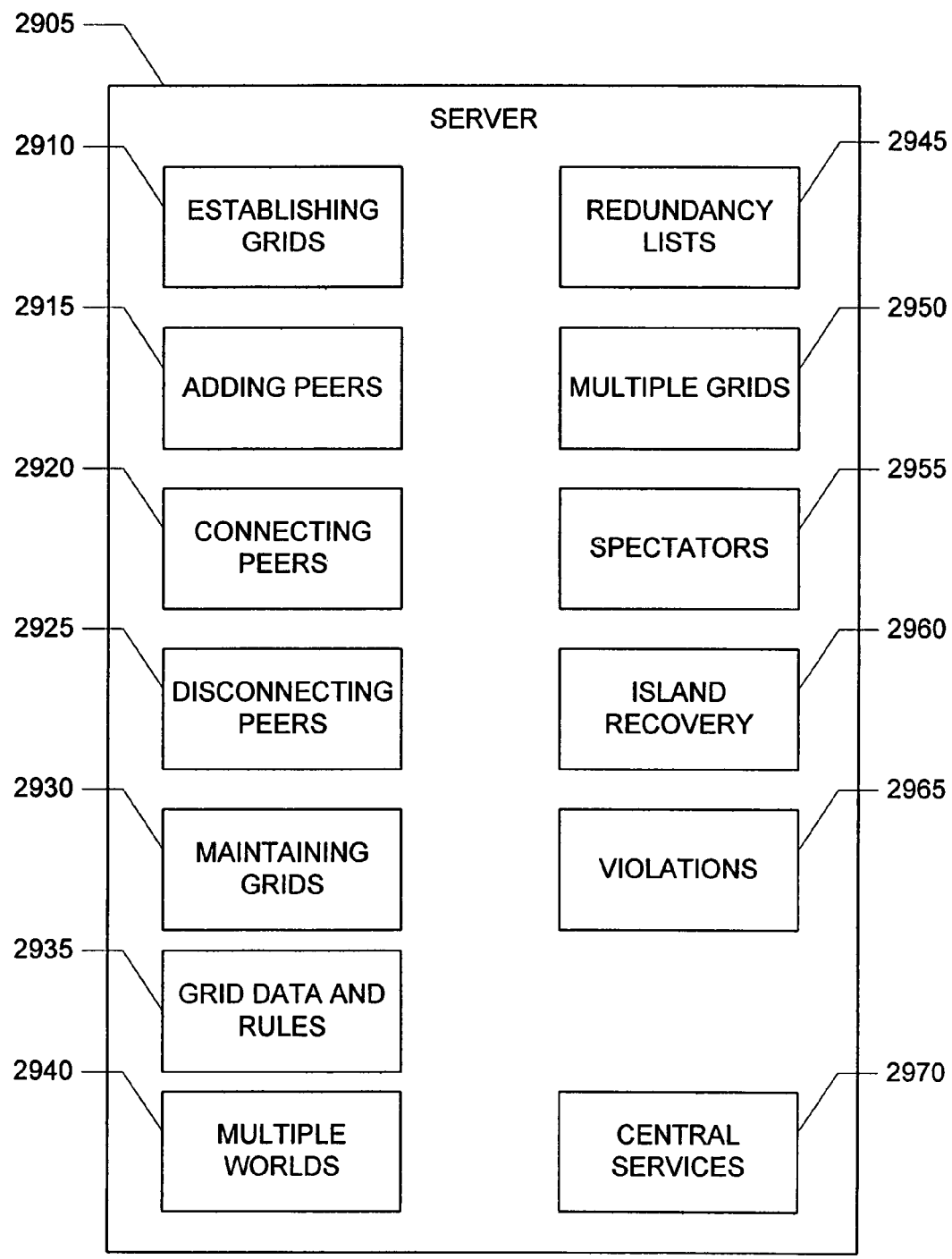
FIGS. 29 and 30 show block diagrams of one implementation of a server and a peer system, respectively.
Figure 30:
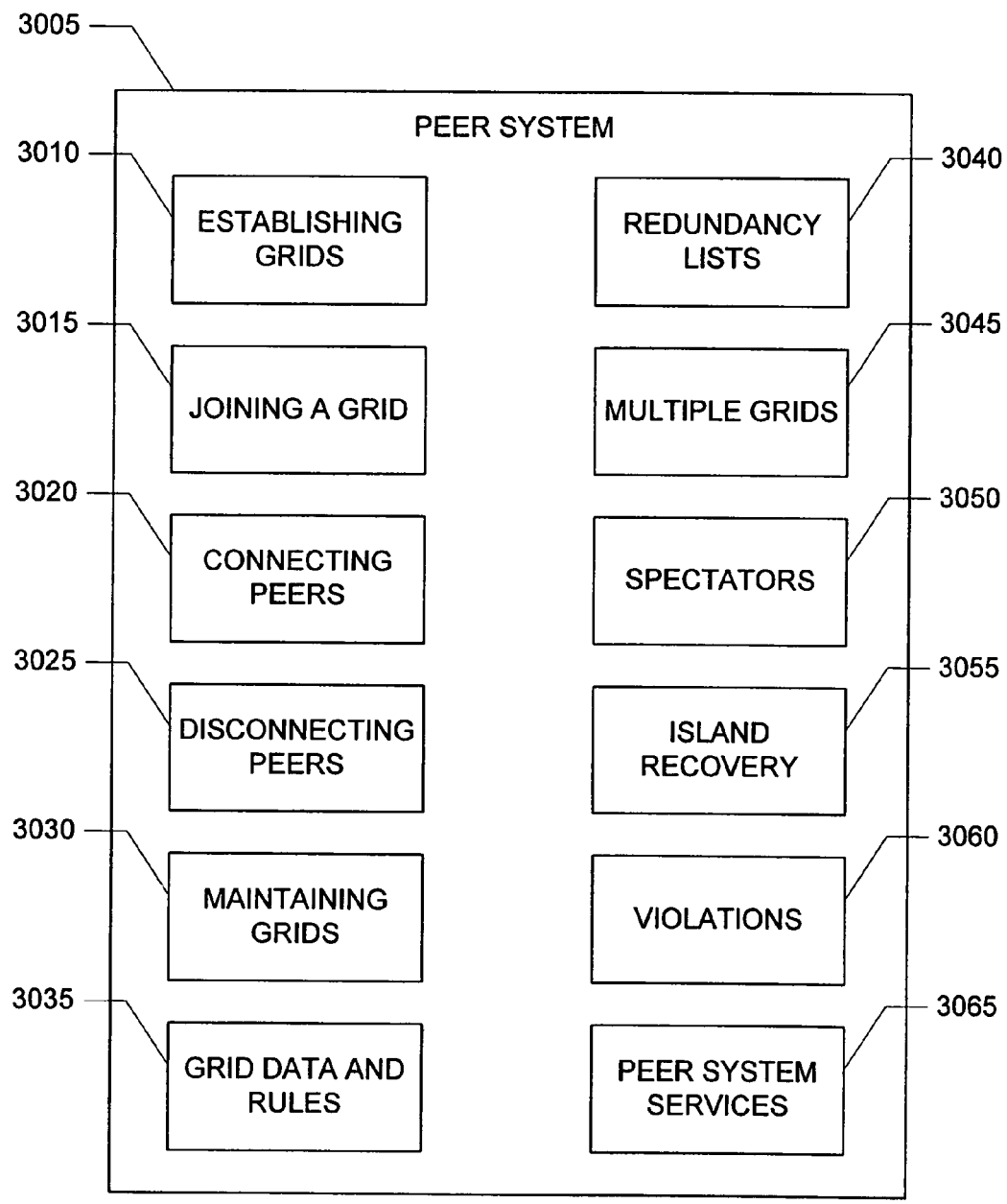
Figure 31A:
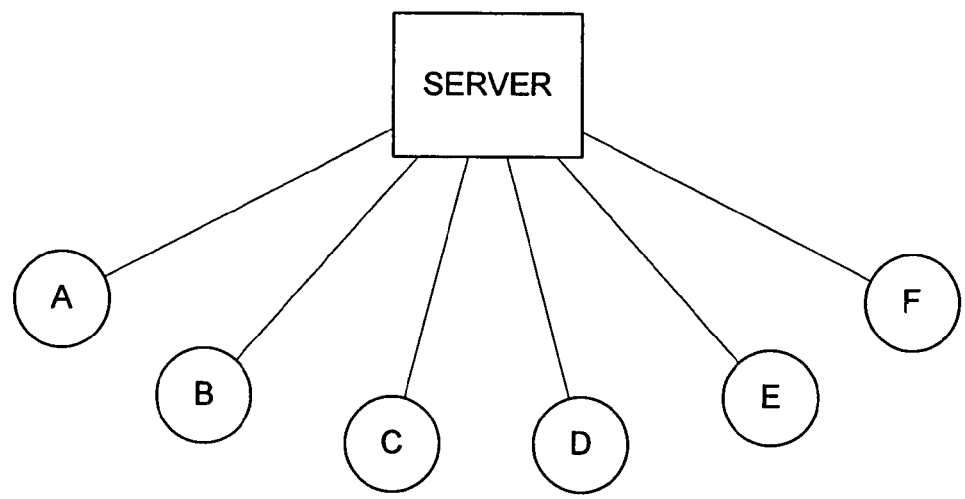
FIGS. 31A and 31B illustrate typical client-server and peer-to-peer architectures.
Figure 31B:
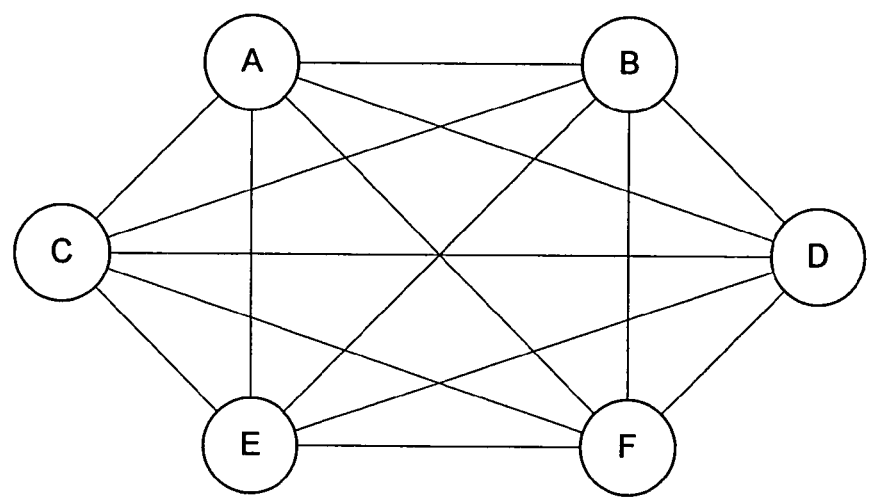

FIGS. 29 and 30 show block diagrams of one implementation of a server 2905 and a peer system 3005, respectively. In other implementations, a server or a peer include fewer components than shown in FIGS. 29 and 30, or include different or additional components.

The server 2905 operates as described above and includes components to provide the functionality described above, including components for establishing grids 2910, adding peers 2915, connecting peers 2920, disconnecting peers 2925, maintaining grids 2930, storing and generating grid data (e.g., connections, members, connection limits) and rules (e.g., relay rules, connection rules) 2935, managing multiple worlds 2940, managing and assisting with redundancy lists 2940, managing multiple grids 2950, managing spectators and participants in grids 2955, handling island detection and recovery 2960, managing and addressing cheating and security violations 2965, and central services of the server 2970 (e.g., network communication and addressing, player matching, chat facilities, data backup, etc.).

The peer system 3005 operates as described above and includes components to provide the functionality described above, including components for establishing grids 3010, joining a grid 3015, connecting peers 3020, disconnecting peers 3025, maintaining grids 3030, storing and generating grid data (e.g., connections, members, connection limits) and rules (e.g., relay rules, connection rules) 3035, building, updating, and using redundancy lists 3040, operating in multiple grids 3045, operating with and as spectators and participants in grids 3050, handling island detection and recovery 3055, managing, detecting, and addressing cheating and security violations 3060, and peer system services 3065 (e.g., network communication and addressing, player matching, chat facilities, data backup, etc.).

Various implementations of the peer-to-peer relay network provide desirable benefits. A grid can be very useful in a number of network applications, including online massive multi-player computer games. Online game applications are just one example of a larger group of network applications that have one thing in common: sharing and maintaining one common data set. When the data set is updated on one peer, the information is sent to a group of other peers and relayed throughout the grid so each peer will have an updated data set. The relay grid allows connected peers with limited network bandwidth to exchange data among themselves, without going through a central server (for data distribution). This network can be used to exchange game data, other game related information, media files, streaming audio, or streaming video.

For example, in one implementation the peers use the grid for file publishing. A peer in the grid publishes a file (as one message or broken into multiple messages) by sending the file to the peers connected to the publisher and the member peers of the grid relay the file throughout the grid to all the members. In this way all the members of the grid can receive the published file without using a server and without using a direct connection from the published to every peer. In various implementations, any type of file can be published. The files can be data, media, or executable software applications. Examples of files to be published through a grid include, but are not limited to: streaming media (e.g., audio and/or video), media files, replay data from a game or other application, maps, announcements, messages, application data and modules (e.g., a map, a template, a texture, a sound).

The various implementations of the invention are realized in electronic hardware, computer software, or combinations of these technologies. Most implementations include one or more computer programs executed by a programmable computer. For example, in one implementation, each peer system and the server includes one or more computers executing software implementing the peer-to-peer relay network functionality. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description describes several implementations of peer-to-peer relay networks discussed in the context of supporting game applications, other applications are also possible, such as file sharing or other data dissemination applications.

Accordingly, the present invention is not limited to only those implementations described above.

What is claimed is:

1. A method of maintaining a peer-to-peer relay network, comprising:

sending a maintenance message from a peer computer system to each of one or more connected peer computer systems connected to said peer computer system in a peer-to-peer relay network;

evaluating any responses received from said one or more connected peer computer systems;

determining the connection between said peer computer system and a connected peer computer system is a failed connection when the response from that connected peer computer system is not acceptable;

sending, in response to determining a failed connection, a close connection request message to the connected peer computer system;

closing the connection between the peer computer system and a connected peer computer system when a confirmation is received from the connected peer computer system, and in response to closing the connection, sending a connection available message to other peers in the peer-to-peer relay network, wherein when the peer-to-peer network is connected to a server, sending the connection available message to the server, wherein each peer computer system is connected to a number of other peer computer systems that is less than or equal to a connection limit and each peer computer system stores a set of one or more relay rules for relaying data to the other peer computer systems connected to that peer computer system.

2. The method of claim 1, wherein:
said maintenance message is a ping message.

3. The method of claim 1, wherein:
a response from a connected peer computer system is not acceptable if the response is not received by said peer computer system within a time limit.

4. The method of claim 1, wherein:
a response is considered not acceptable if the response is not received.

5. The method of claim 1, wherein:
a response from a connected peer computer system is considered not acceptable if said peer computer system has not received a response from that connected peer computer system within a time limit multiple times.

6. The method of claim 1, further comprising:
sending a connection status request to a server for a connection between said peer computer system and a connected peer computer system if the response from that connected peer computer system is not acceptable.

7. The method of claim 1, further comprising:
sending an update to a server indicating a connection has been closed for each connection closed by said peer computer system.

* * * * *